(12) United States Patent
Ljøsne et al.

(10) Patent No.: US 12,534,158 B2
(45) Date of Patent: Jan. 27, 2026

(54) PEDALLY PROPELLED VEHICLE GEAR SYSTEM AND METHOD FOR OPERATING SUCH

(71) Applicant: CA TECHNOLOGY SYSTEMS AS, Oslo (NO)

(72) Inventors: Knut Tore Ljøsne, Lom (NO); Jakob Deraas Grimsgaard, Nittedal (NO); Daniel Preining, Linz (AT)

(73) Assignee: MONT INVEST 30 AS, Oslo (NO)

( * ) Notice: Subject to any disclaimer, the term of this patent is extended or adjusted under 35 U.S.C. 154(b) by 226 days.

(21) Appl. No.: 18/260,760

(22) PCT Filed: Dec. 23, 2021

(86) PCT No.: PCT/NO2021/050284
§ 371 (c)(1),
(2) Date: Jul. 7, 2023

(87) PCT Pub. No.: WO2022/154668
PCT Pub. Date: Jul. 21, 2022

(65) Prior Publication Data
US 2024/0059372 A1 Feb. 22, 2024

(30) Foreign Application Priority Data

Jan. 14, 2021 (NO) .................................. 20210048

(51) Int. Cl.
*B62M 6/50* (2010.01)
*B62J 45/411* (2020.01)
*B62M 25/00* (2006.01)

(52) U.S. Cl.
CPC .............. *B62M 6/50* (2013.01); *B62J 45/411* (2020.02); *B62M 25/00* (2013.01)

(58) Field of Classification Search
CPC ......... B62M 6/50; B62M 25/00; B62J 45/411
See application file for complete search history.

(56) References Cited

U.S. PATENT DOCUMENTS 9,452,748 B2 * 9/2016 Gibson .................. F16H 63/46
2009/0132135 A1 5/2009 Quinn, Jr. et al.
(Continued)

FOREIGN PATENT DOCUMENTS

| EP | 0543452 A1 | 5/1993 |
|---|---|---|
| EP | 1129933 A2 | 9/2001 |

(Continued)

OTHER PUBLICATIONS

International Search Report for PCT/NO2021/050284 mailed Apr. 4, 2022, 3 pages.

(Continued)

*Primary Examiner* — Gertrude Arthur Jeanglaude
(74) *Attorney, Agent, or Firm* — NIXON & VANDERHYE

(57) ABSTRACT

A system and method for operating a pedally propelled vehicle gear system, includes a multi-speed gear configured to provide varying gear ratios between a gear input element and a gear output element, wherein the method includes receiving a shift control signal indicating that a gear shift should be performed, providing a boost control signal to the motor to run at a boost torque bT for a boost torque time period tbT, providing a dip control signal 154 to the motor to run at a dip torque dT for a dip torque time period tdT, wherein the boost torque is higher than the dip torque.

20 Claims, 11 Drawing Sheets

(56) References Cited

U.S. PATENT DOCUMENTS

2013/0090819 A1* 4/2013 Cheng ..................... B62M 6/45
                                                    701/64
2018/0118211 A1* 5/2018 Tsuchizawa .......... B60W 10/08
2019/0031290 A1   1/2019 Kurokawa et al.

FOREIGN PATENT DOCUMENTS

| EP | 2581299 A1 | 4/2013 |
| TW | I545279 B | 8/2016 |
| WO | 2012128639 A1 | 9/2012 |
| WO | 2017149396 A2 | 9/2017 |
| WO | 2020130841 A1 | 6/2020 |

OTHER PUBLICATIONS

Written Opinion of the ISA for PCT/NO2021/050284 mailed Apr. 26, 2022, 11 pages.
Search Report, issued in Taiwanese Patent Application No. 111101065 dated Jul. 8, 2025.

* cited by examiner

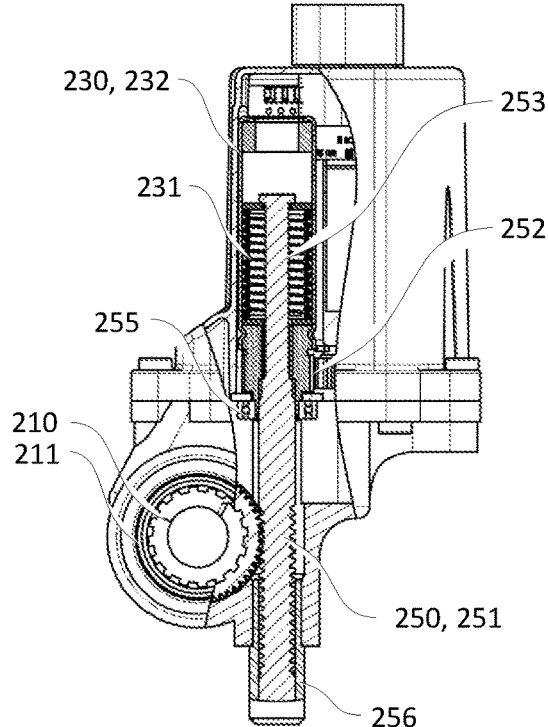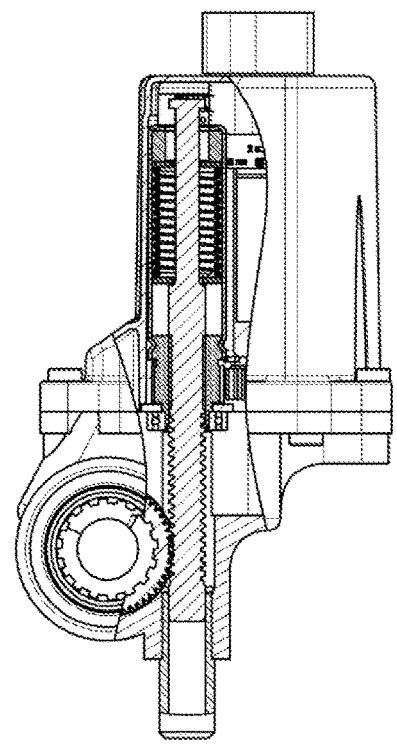
Fig.17a    Fig.17b
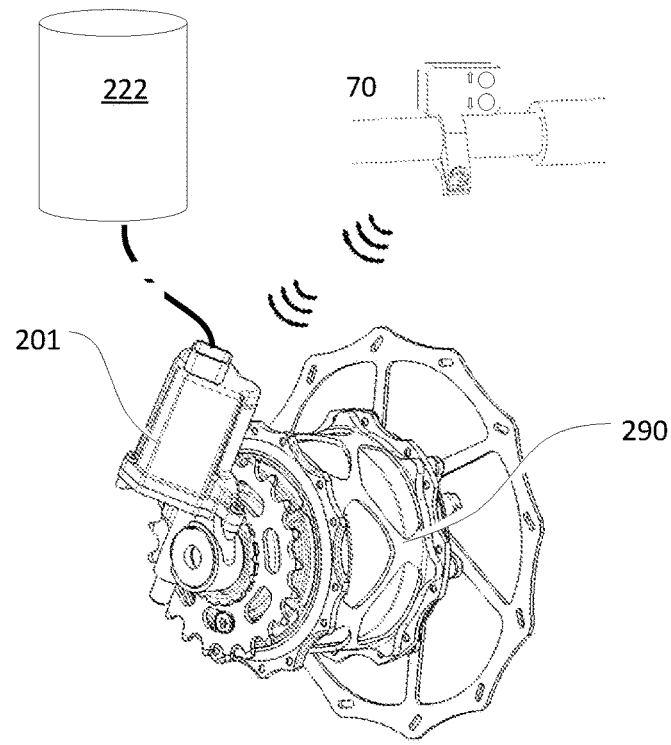
Fig. 18

PEDALLY PROPELLED VEHICLE GEAR SYSTEM AND METHOD FOR OPERATING SUCH

CROSS-REFERENCE TO RELATED APPLICATIONS

This application is the U.S. national phase of International Application No. PCT/NO2021/050284 filed Dec. 23, 2021, which designated the U.S. and claims priority to NO 20210048 filed Jan. 14, 2021, the entire contents of each of which are hereby incorporated by reference.

TECHNICAL FIELD

The present invention relates to a pedally propelled vehicle gear system. The invention is of specific relevance for vehicles with multiple gears, where shifting is performed under torque and/or where the performance of the vehicle is seriously affected by the torque loss during shifting. Such vehicles could be e.g., pedally propelled vehicles where the pedaling is unassisted or assisted by a motor, such as for an electric bicycle.

BACKGROUND

As described initially, the invention can be used in a wide range of applications. One such application is pedally propelled vehicles.

Most pedally propelled vehicles, such as bicycles are equipped with some sort of selectable gear ratio to improve pedaling efficiency and comfort.

Different from gears in other types of vehicles that are motor driven, where a gear system and motor drive system can co-operate during the gear shift, a bicycle control system is not able to control the rider and the torque from the rider on the pedals in the same way.

Experienced riders have therefore developed their own understanding and application of a shifting scheme. The optimum shifting scheme will depend on the type of bicycle, the characteristics of the rider etc., which means that practically no shifting schemes will be the same.

This is cumbersome, and one can easily observe that less experienced, and even experienced riders struggle to shift gears efficiently in certain situations.

With the introduction of electrical bikes, where pedaling is supported by a motor drive, the same problem remains. The shift control system can control the contribution from the motor, but not from the rider.

While many experienced riders in the sport segment have accepted and even appreciate developing their own shifting scheme, shifting remains a hurdle for many riders, and for any pedally propelled vehicle with motorized support, such as standard pedelecs, moped style e-bikes, electric cargo vehicles with two or more wheels, mountain bikes, leisure bikes, commuter bikes etc., this problem is increasing with the number of such vehicles and riders affected.

The pedaling rate is defined as the number of revolutions of the crank shaft per unit time. This is also termed the cadence and is mostly defined as rounds per minute rpm.

Although an optimal cadence is unique for every rider, it is clear that the human physiology in general does not allow large variations in cadence in order to maintain efficient power production and comfort.

Most modern bicycles are therefore equipped with some sort of variable gear mechanism to vary the relationship between the cadence and the rotational speed of the drive wheel. By changing the gear ratio, the desired cadence can be selected for different speeds and different cycling conditions, such as e.g., uphill or downhill.

The gear shift is performed by a gear shift mechanism. The type of gear shift mechanism will depend on the type of gear system used in the specific case.

However, efficient shifting of gears on a bicycle requires precision and timing. Experienced riders know that they should shift close to the dead point of the crank to reduce the torque from the rider's feet present on the gear mechanism. A large torque makes shifting more difficult and will usually reduce the lifetime of the shift mechanism and the transmission.

E-bikes add more complexity to the gear shifting. In addition to the torque from the rider, the torque from the motor should be taken into account as well. If the experienced rider eases off the pedals for shifting, the shifting mechanism will still struggle if a large torque from the electric motor is present. Vice-versa will a large torque from the rider represent a problem for shifting, even in the event that the control system is able to reduce the torque from the motor during shifting temporarily.

Thus, there is a need for an improved shifting mechanism that takes the responsibility for smooth and efficient shifting off the experienced or less experienced rider, both for assisted and un-assisted pedaling.

WO2012128639A1 and WO2020130841 disclose multi-speed gears for a pedally propelled vehicle.

WO207149396 discloses a sequential gear shifter for a multi-speed system.

A gear system will have an input and an output. In the context of vehicle gears aimed at propulsion, the input and output are generally rotating elements, and the input will therefore be a rotating input element, while the output will be a rotating output element. By varying the gear ratio between the input and the output element, a varying rotational speed difference between the input and output element is achieved, as well as a varying relative torque between the input element and the output element.

Between the input and output elements, interacting mechanical gear elements, such as meshing gears are shifted in and out of engagement to provide the gear shifts. Depending on the relative torque between the input and output element, the disengagement and engagement of gear elements will require more or less force. In the case where a shift element is moving axially or radially to engage or disengage gear elements, the linear force required for engagement/or disengagement may increase with increasing torque between the input and output elements. The same would be true for a rotating shift element, but in this case, it is the shifting torque that increases.

The performance of a vehicle depends among other things on the vehicles overall weight. It is therefore important that the weight of the gear system is reduced as much as possible. This becomes even more critical for pedally propelled vehicles, such as bicycles at least partly operated by a human rider. Although reduction in mechanical strength and durability of the gear components as a result of weight and size reduction can be partly compensated by choosing other types of materials, it will always be a torque threshold for performing a gear shift based on the mechanical characteristics of the available gear components.

It should be mentioned that material costs will increase considerably when trying to reduce weight and size while maintaining the mechanical strength of a specific gear design.

Mechanical gear shifts rely on connection and disconnection of mechanical elements such as e.g., pawls or dog clutches. When the mechanical elements are entirely in mesh, they provide a strong mechanical connection and are not adversely affected by wear, given that they are correctly designed. Further, when the mechanical elements are completely disconnected, mechanical wear is of no particular problem.

However, when the mechanical elements are in an intermediate state between fully connected and fully disconnected states, the mechanical elements are only partly connected and may break or wear if subject to a high torque. The gear mechanical elements will be in the intermediate stage during a gear shift.

The longer the mechanical elements are in the intermediate stage, the more they will wear, given that the torque is constant. Further, the mechanical elements will in general remain longer in the intermediate stage for a high torque than for a lower torque.

The shifting time, i.e., the time the mechanical elements remain in the intermediate stage, depends on the actuation force and actuation speed. The actuation force is the force engaging or disengaging the mechanical elements. If the force is large, it is easier to overcome the counter force resulting from the torque between the mechanical elements.

Manually actuated gear shifting is used in a number of gear systems. In this case the actuating force depends on the force applied by the operator. Some operators may be able to provide a large force, while others can only apply a more limited actuating force. While a too large force may break the mechanical elements inside the gear or the actuating mechanism, a too small force may prevent gear shift.

To reduce wear, shifting time and necessary actuating force, many bike riders have developed a habit of shifting when the torque is low, e.g., when the pedals are close to vertical, i.e. the Top Dead Center TDC.

More and more gear systems are provided with assisted actuation, such as an electrically operated shift actuator close to the gear unit. The actuation moment or torque and actuation speed of the shift actuator is determined by the design, and prior art electrically operated shift actuators do in general not provide sufficient shift reliability and shift speed, especially under challenging conditions such as high torque.

It is therefore a general problem with pedally propelled gear systems that gear shifting takes too long time and is unreliable.

SHORT SUMMARY

The invention is a pedally propelled vehicle gear system and a method for operating a pedally propelled vehicle gear system as set out in the independent claims, where the problem identified above has been solved.

The invention has one or more of the following advantages over prior art.

First of all, a multispeed gear system with the gear system and method according to the invention will in many situations shift more instantly than prior art solutions, and torque loss during shifting may be reduced.

In the case of a pedally propelled vehicle, the shifting will be more reliable and predictable, since it is less dependent on the behavior of the rider.

The gear system and method can in many cases easily be integrated with existing multi-speed gears.

The gear system and method comprise only a small number of components that are easily manufacturable.

The gear system and method require little or no additional space over a prior art shift actuator without the additional features proposed.

The gear system and corresponding method is able to perform a gear shift fast due to a high available torque.

The gear system and method can be used both for up- and down shifts.

The gear system and method can be used for different types of vehicle configurations, whether the multispeed gear system is arranged e.g., in the wheel hub or near the crank for pedally propelled vehicles.

BRIEF DESCRIPTION OF THE DRAWINGS

FIGS. 7 and 8 FIGS. 1 and 2 illustrate in isometric, partly cut away views, a gear actuator 121 that may be used in embodiments of the invention to obtain reduced switching time and accuracy.

Figure 11:
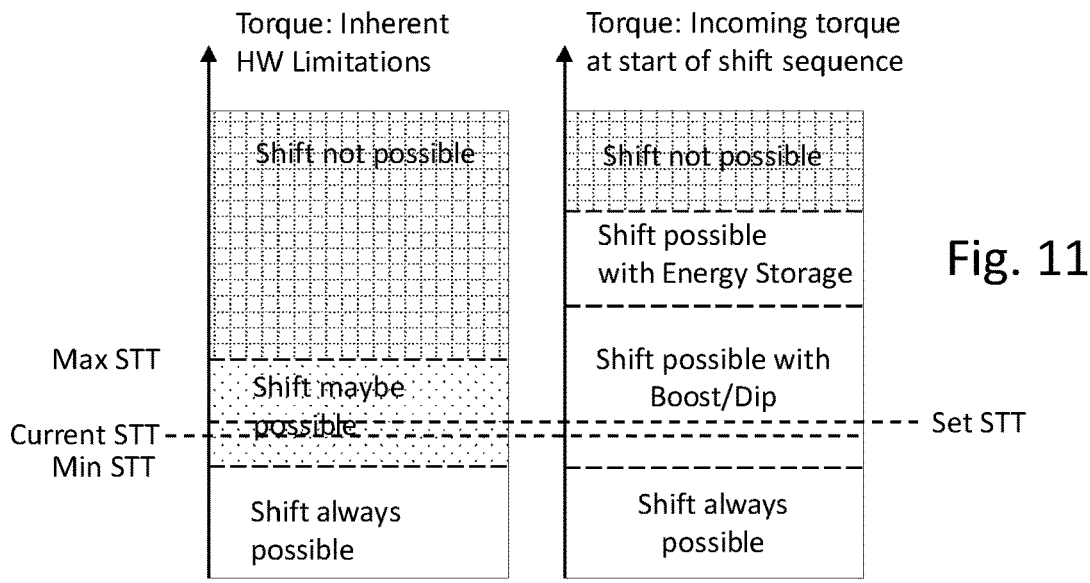
FIG. 11 illustrates to the left schematically how inherent hardware limitations in the gear system will prevent a gear shift to take place above the Current Shift Torque Threshold, Current STT.

The right part of FIG. 11 illustrates schematically how a gear shift can take place with the present invention, even when the total torque across the gear system is Current STT.

Figure 12:
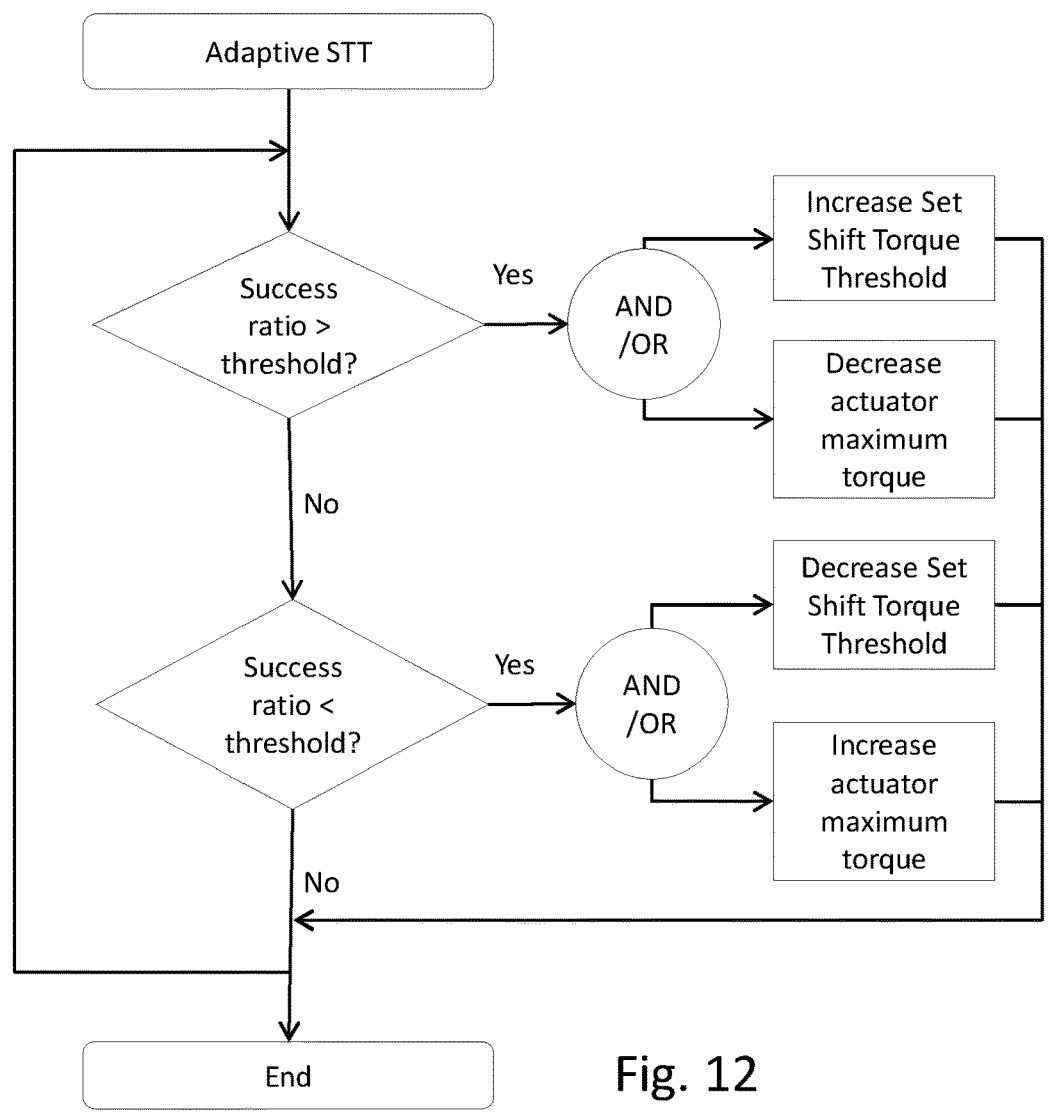

FIG. 12 illustrates in a flow diagram adaptive STT according to embodiments of the invention.

Figure 13:
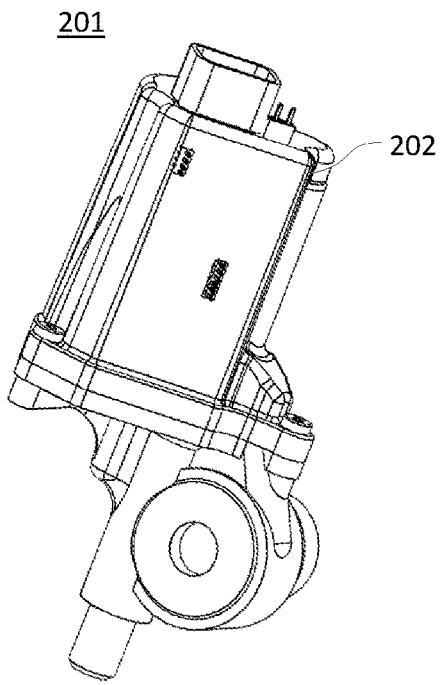
Figure 14:
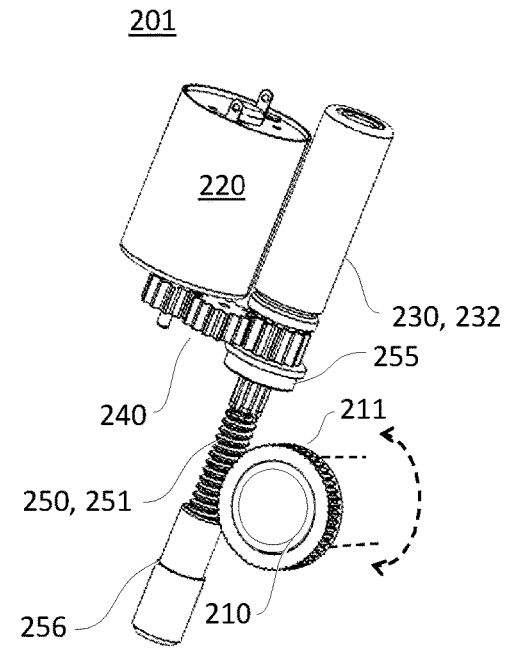

FIG. 13 and FIG. 14 illustrates in isometric views, with and without housing 202 a gear shift actuator 201 that may be used in embodiments of the invention to obtain reduced switching time and accuracy. The internal parts are hidden by the housing 2. On the top of the housing there are electric connectors for electric power supply and connection to a control system. The communication with the control system could also be wireless, and in this case no physical control interface would be required.

Figure 15:
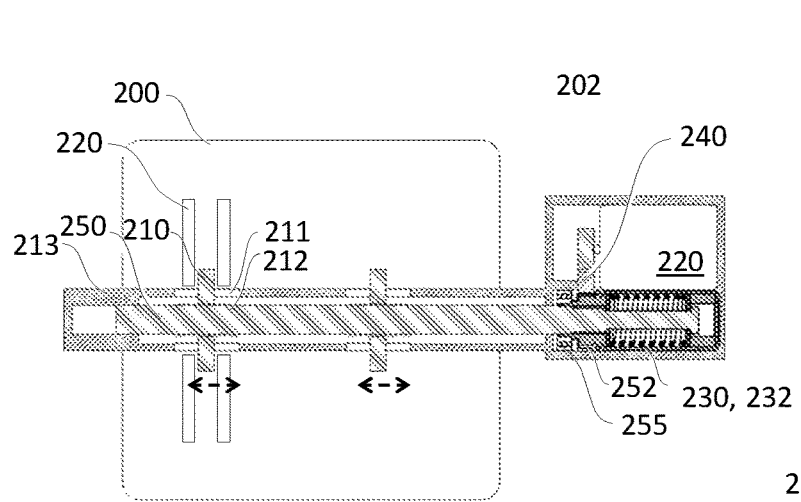

FIG. 15 Illustrates in a sectional and partly schematic view an alternative gear shift actuator 202 allowing a shift axle 210 to move longitudinally, according to an embodiment of the invention.

Figure 16:
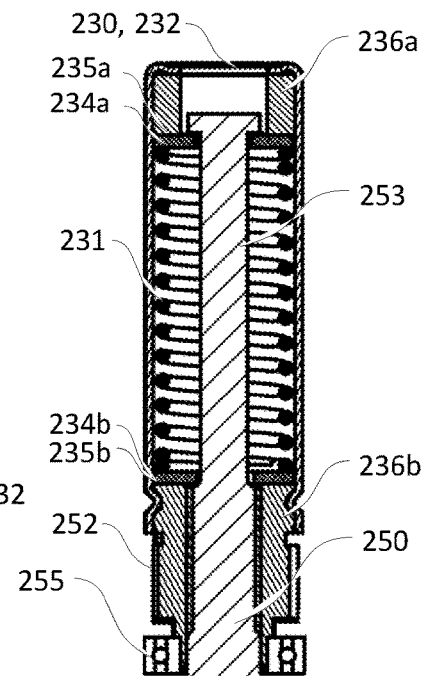

FIG. 16 is a section view of the energy storage element 230 in an embodiment of the invention and illustrates a detail of the energy storage element 230 shown in FIGS. 13, 14 and 15.

FIG. 17a illustrates in a partly sectionalized view the vehicle gear shift actuator 201 of FIGS. 13 and 14. Here the energy storage element 230 is a in lower end-position where the energy storage element is loaded with energy that forces the energy transfer element 250 in the upward direction, that in turn provides a counterclockwise torque on the shift axle 210.

FIG. 17b illustrates in a partly sectionalized view the vehicle gear shift actuator 201 of FIGS. 13 and 14. Here the energy storage element 230 is an upper end-position where the energy storage element is loaded with energy that forces the energy transfer element 250 in the downward direction, that in turn provides a clockwise torque on the shift axle 210.

FIG. 18 illustrates in a combined schematic and isometric drawing a gear shift actuator 201 operating an internal multi-speed hub-gear of a pedally propelled vehicle. The multi-speed gear system 290 comprises planetary gear sets and could e.g. be the type of gear disclosed in WO20201230841. A battery 222 providing electric energy to the control system and the motor of the shift system is indicated as connected via electric connectors. The battery could e.g. be located inside the seat-pin or in any other suitable location. A wireless gear operator 70 arranged on the handlebar is connected to the control system.

EMBODIMENTS OF THE INVENTION

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

The embodiments described below are numbered. In addition, dependent embodiments defined in relation to the numbered embodiments are described. Unless otherwise specified, any embodiment that can be combined with one or more numbered embodiments may also be combined directly with any of the dependent embodiments of the numbered embodiments referred to.

EM1: A computer implemented method for operating a pedally propelled vehicle gear system, wherein the gear system 100 comprises;
a multi-speed gear 110, 290 configured to provide varying gear ratios between a gear input element 111 and a gear output element 112, wherein the method comprises;
receiving a shift control signal 172 indicating that a gear shift should be performed,
providing a boost control signal 153 to the motor drive to run at a boost torque bT for a boost torque time period tbT,
providing a dip control signal 154 to the motor to run at a dip torque dT for a dip torque time period tdT, wherein the boost torque is higher than the dip torque.

In a first dependent embodiment, the gear system comprises a movable shift element 10, 210 configured to shift gears in the multispeed gear;

In a second dependent embodiment, that may be combined with the first dependent embodiment, the gear input element is configured to be driven from both a crank drive 130 and a motor drive 140.

EM2: The method according to EM1, wherein the gear system has a Current Shift Torque Threshold STT, wherein the Current STT represents the maximum torque between the gear input element 111 and the gear output element 112 for a shift of gear ratio in the multi-speed gear to be performed. I.e., if the total torque across the multispeed gear is above the Current STT, the gear shift cannot be carried out. This total torque may be the sum of the torque contributions from the crank drive and the motor drive.

Even when the contribution from the rider and motor is absent, i.e. the total torque is zero, a certain minimum actuation torque is required to shift from one gear to another. This is due to the force required to move clutches and/or gears inside the gear system. The minimum actuation torque may depend on the temperature, viscosity of lubrication etc. The minimum actuation torque may also depend on the specific shift performed, such that e.g., the minimum actuation torque from second to third gear may be larger than the minimum actuation torque from third to fourth gear.

Thus, a gear shift can only be performed when the total torque across the across the multispeed gear is below Current STT, and the actuator torque is above the minimum actuation torque.

In a first dependent embodiment the gear system Current STT is in the range equal to or larger than a minimum STT and equal to or smaller than a maximum STT.

In a second dependent embodiment, that may be combined with any of the dependent embodiments above, the maximum STT is a pre-defined value based on a worst-case shifting torque. E.g., least performing operating temperature, end of service interval, new gear components etc.

In a third dependent embodiment, that may be combined with any of the dependent embodiments above, the minimum STT is a pre-defined value based on best case shifting torque. E.g., best performing operating temperature, beginning of service interval, run-in gear components etc.

In a fourth dependent embodiment, that may be combined with any of the dependent embodiments above, the maximum and/or minimum STT are gear shift specific. I.e., they have specific values for each gear shift such as one set of values for shifting from third to fourth gear and another set of values for shifting from fourth to fifth gear. Up-shift and downshift may typically also have separate values.

EM3: The method according to EM2, wherein the method comprises;
receiving a crank torque signal 132 from a crank torque sensor 131 representative of the torque difference between the crank drive and the gear input element, and
receiving a motor torque signal 142 from the motor drive representative of the torque difference between the motor drive and the gear input element, wherein
the sum of the boost torque and a crank torque from the crank torque signal is higher than the Current STT, and
the sum of the dip torque and the crank torque from the crank torque signal is lower than the Current STT.

In a first dependent embodiment the method comprises;
providing a pre-boost control signal 152 to the motor to run at a pre-boost torque pT for a pre-boost torque time period tpbT after receiving a shift control signal and before providing a control signal to the motor to run at a boost torque bT, wherein the pre-boost torque is lower than the boost torque and higher than the dip torque.

In a second dependent embodiment that may be combined with the first dependent embodiment, the method comprises;
receiving a crank torque signal 132 from a crank torque sensor 131 representative of the crank torque as the torque difference between the crank drive and the gear input element, and
receiving a motor torque signal 142 from the motor drive representative of the motor torque as the torque difference between the motor drive and the gear input element,
calculating a total torque as the sum of the crank torque and the motor torque,
providing the pre-boost control signal 152 only when the total torque is below a pre-boost torque threshold.

In a third dependent embodiment, that may be combined with the first or second dependent embodiment, the pre-boost torque threshold is the same as the Current STT.

In a fourth dependent embodiment, that may be combined with the third dependent embodiment the pre-boost torque threshold is the Current STT plus a torque security margin.

EM4: The method according to any of EM 1 to EM3 above, wherein the multi-speed gear comprises a shift actuator 121, 201, 202 configured to move the shift element 10, 210 and the method comprises;
sending a first gearshift signal 143 to the gear shift actuator before providing the boost control signal to the motor drive 140.

In a dependent embodiment, that may be combined with the dependent embodiments of EM 3, wherein the method comprises;
sending the first gearshift signal 143 to the gear shift actuator after providing the pre-boost control signal.

In the case where a shift actuator is used to operate a shift element of the gear system, such as a shift axle, the shift torque threshold may be limited by the maximum torque of the shift actuator, rather than the mechanical strength of the gear elements. If the maximum torque of the shift actuator is high, it is possible to perform a gear shift with a higher torque across the gear system than if the maximum torque of the shift actuator is low. I.e., the Current STT becomes a function of the maximum torque that the shift actuator is able to deliver. In other words, in order to be able to shift under heavy load, i.e., a large total torque, the torque of the actuator should be high.

EM 5: The method according to any of EM1 to EM4 above, wherein the gear system comprises a shift actuator 121, 201, 202 configured to move the shift element 10, 210 wherein the shift actuator is configured to have a maximum actuator force and/or a maximum actuator torque acting on the shift element, wherein the method comprises setting the maximum actuator force and/or maximum actuator torque.

In a first dependent embodiment, the method comprises modifying the Current SU by modifying the maximum actuator force and/or maximum actuator torque. The Current STT is here a function of the shift actuator force and/or torque.

EM 6: The method according to any of EM 2 to EM5, comprising setting a Set Shift Torque Threshold value, Set SU, representing the Current SU.

In a first dependent embodiment, the Set SU is in the range between the maximum STT and the minimum SU.

In a second dependent embodiment the Set SU is equal to the maximum SU, optionally with an additional security margin.

The success of a gear shift may be measured by detecting a sudden fall in current to the servo motor of the shift actuator.

The method according to any of EM 5 to EM6, comprising;
measuring the success rate of a series of gear shifts.

In a first dependent embodiment, the method comprises;
measuring the success of a gear shift by detecting that the actuator torque drops from a high value to a low value.

In a second dependent embodiment, wherein the actuator is driven by an electric source and actuator force and/or torque is measured by measuring the current to the actuator from the electric source, wherein a high force and/or torque value has a respective higher current than a low force and/or torque value.

The sudden fall in current indicates that the actuators position has changed and not necessarily that a full gear shift has taken place. A further measurement of the difference in rotational speed of the gear input element and gear output element can be compared to an expected gear ratio to determine the actual success. In this case it is expected that all the gear ratios are available in the control system. The difference in rotational speed of the gear input element and gear output element can be measured by rotational sensors.

In a third dependent embodiment the measuring of the success of a gear shift comprises;
measuring and input speed on the input element,
measuring an output speed on the output element,
comparing the input speed and output speed with expected input and output speeds. If the input speed and output speeds equals the expected input and output speeds, the shift is successful, else it is unsuccessful. Instead of measuring and comparing individual values, the speed difference can be compared to a known speed difference. The speed measurements may be made with rotational speed sensors.

The method according to EM 7, comprising;
increasing the Set STT and/or decreasing the actuator force/torque if the success rate is above a predefined high success rate threshold.

In a first dependent embodiment, the method comprises;
decreasing the Set STT and/or increasing the actuator force/torque if the success rate is below a predefined low success rate threshold.

The high success rate threshold is higher than or equal to the low success rate threshold.

In a third dependent embodiment, the method comprises;
setting the pre-defined low success rate threshold and/or high success rate threshold.

Increasing and/or decreasing the Set STT and/or the actuator force/torque, may be done for individual gear shifts, a group of gear shifts or all gear shifts.

An embodiment of the adaptive shift torque threshold is illustrated in FIG. 12.

EM 9: The method according to any of EM2 to EM8 above, comprising modifying any of the boost torque bT, boost torque time period tbT, dip torque dT and dip torque time period tdT.

In a dependent embodiment, the method comprises modifying the pre-boost torque pT and/or the pre-boost torque time tpT.

This may be performed with or without modifying the STT to achieve the required shift success rate that may be defined in the same way as above.

I.e., increasing the dip torque time period tdT to give the gear shift more time or increase boost torque time period tbT to allow more time for the actuator to obtain the necessary torque to increase the STT up to the desired level.

To exemplify the shift torque threshold STT, consider a specific case where a shift from the second to third gear should not—or cannot be carried out if the total torque across the multispeed gear is above 18 Nm, which in this case is the STT. If e.g. the torque contribution from the rider on the crank alone is 20 Nm, and the contribution from the motor is 10 Nm, this gear shift is not possible even in the case where the contribution from the motor is reduced to zero.

As previously disclosed, the Current STT will depend on the design of the multi-speed gear system. If manual actuation is used, it can be based on mechanical strength calculations of the gear internal elements, clutches etc. and/or mechanical strength calculations of gear external elements, such as actuation wires etc. If assisted actuation is used, such as an actuation servo, actuation solenoid etc., the Current STT will often be restricted by the force or torque provided by the actuator.

High actuator torque and high Current STT can be provided by increasing the size of the actuator and the capacity of the actuator power source. For a pedally propelled vehicle as well as for other types of vehicles, this is not a preferred solution.

In the following, embodiments related to a method for operating a pedally propelled vehicle gear system improving shift performance, especially at higher loads, based on a low weight and small size actuator will be presented.

EM 10: The method according to any of the embodiments EM 1 to EM 9 above, wherein the shift actuator 121, 201, 202 comprises;
- a movable shift element 10, 210 configured to shift gears in the multispeed gear;
- an energy source 220;
- an energy storage element 230;
- wherein the energy source is configured to load or charge the energy storage element with potential energy, wherein the shift torque threshold is determined by the potential energy, and the energy storage element is configured to move the shift element.

In a first dependent embodiment, the energy storage element is configured to move the shift element in two opposite directions from an equilibrium position wherein the energy storage element is not charged or loaded with energy from the energy source.

In a second dependent embodiment, that may be combined with the first dependent embodiment, the energy source is configured to load or charge the energy storage element with positive and negative potential energy relative to the equilibrium position. The sign of the energy depends on the shifting direction selected.

In a third dependent embodiment, that may be combined with the first or second dependent embodiment, the energy storage element is pre-loaded with energy in the equilibrium position.

In a fourth dependent embodiment, the method comprises;
- controlling the energy provided from the energy source.

EM 11: The method according to EM 10, comprising;
- initiating energy delivery from the energy source to the energy storage element at a start time t0, and to
- ending energy delivery a pre-defined timespan ts1 after the start time, or ending energy delivery when the storage element has obtained a specific position or rotational angle.

A position or rotation sensor may be applied in the latter case. A combination of the two ways of ending energy delivery is also possible, where the pre-defined timespan ts1 is set sufficiently long to always reach the specific position or rotational angle in a normal shift procedure. If any error occurs, the loading will stop after the pre-defined timespan ts1 even when a gear shift for some reason has not taken place.

Figure 4:
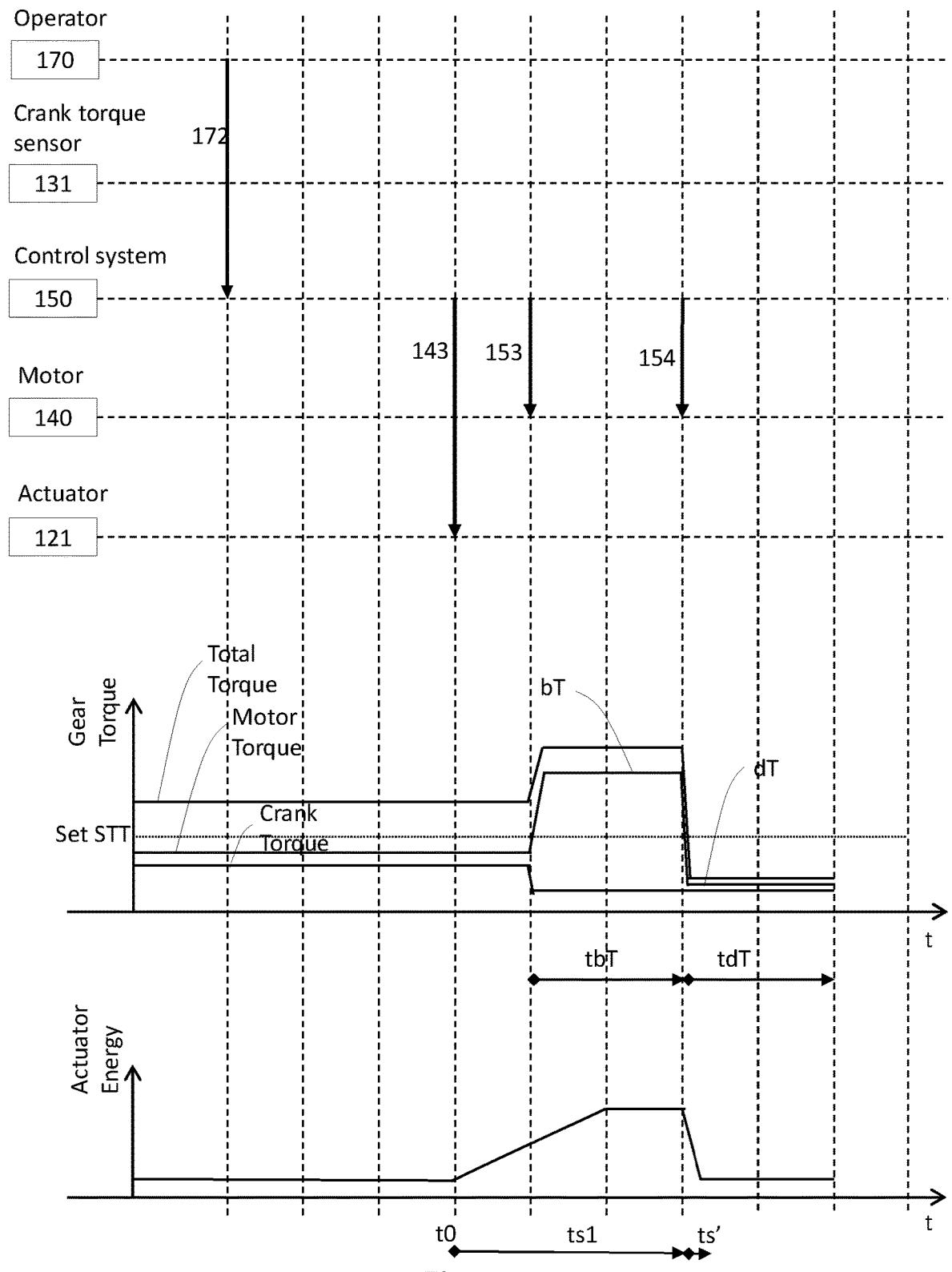
Figure 5:
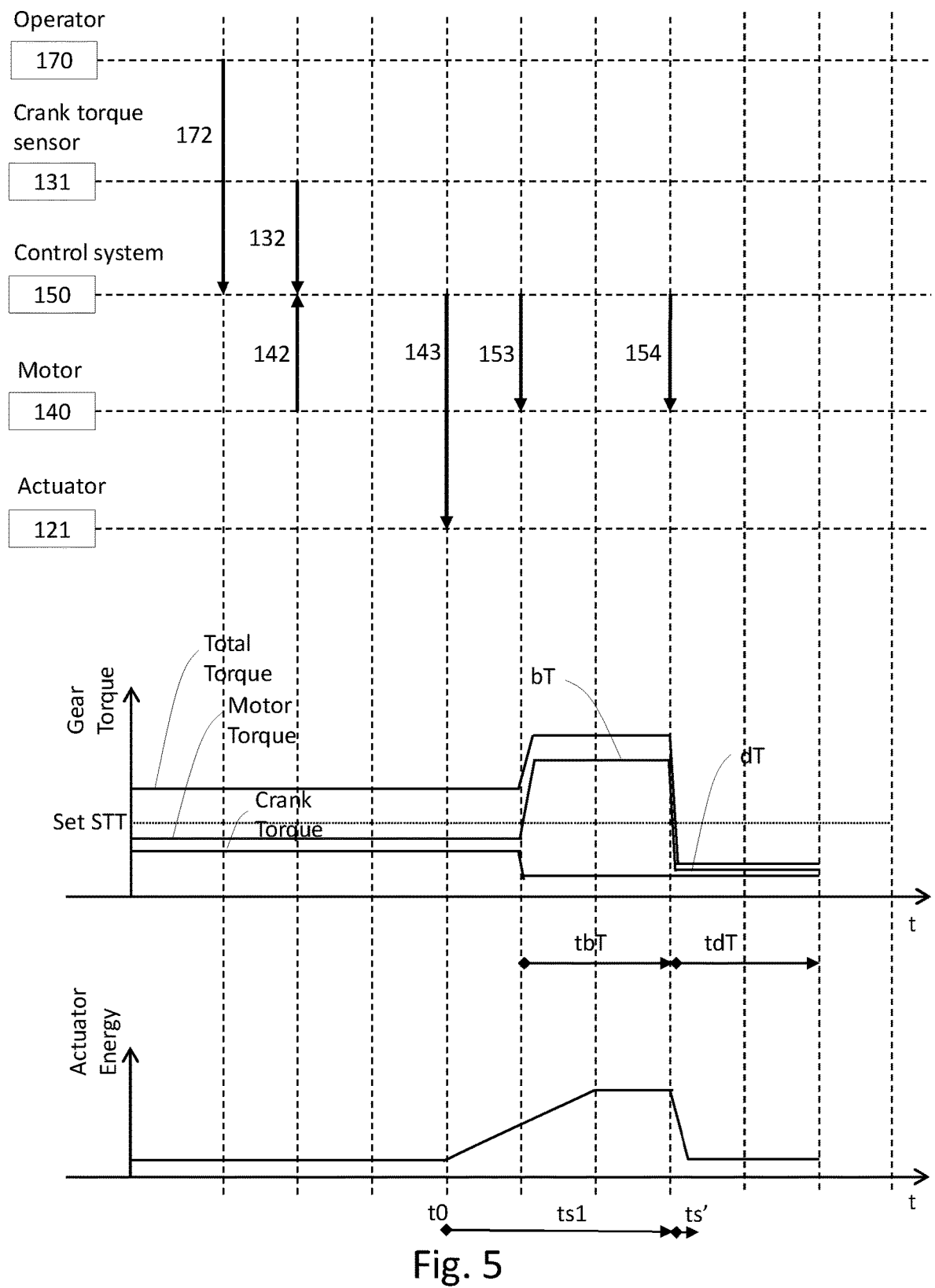
Figure 6:
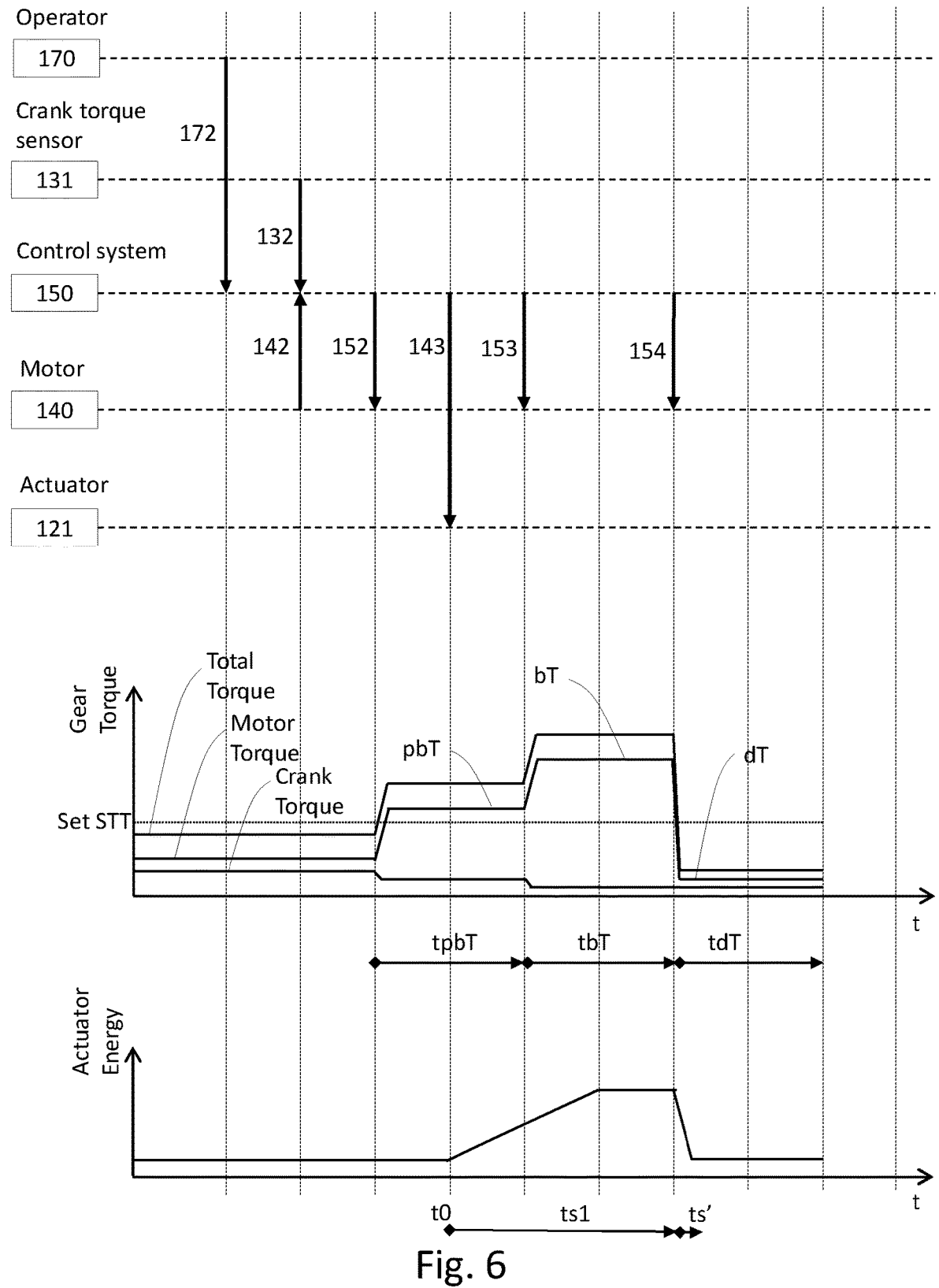

The lower parts of FIGS. 4, 5 and 6 illustrate the energy delivery to the energy storage element in the shift actuator. Energy delivery starts at t0 and the storage element is fully charged with actuation energy after a certain time into the boost torque time period tbT. The remaining time in the boost torque time period is a safety time, as indicated by the flat region, to ensure that the storage element is fully loaded before shifting occurs as a result of the dip control signal.

In a first dependent embodiment, the energy delivery continues until the dip control signal is sent to ensure that the storage element remains fully loaded.

In a second dependent embodiment the gear system comprises a gear operator 70 comprising a gear operator sensor 71 connected to the control system and configured to detect one or more gear shifts of the gear operator wherein the control system is configured to set the start time t0 on or after a gear shift is detected by the gear operator sensor.

In a third dependent embodiment, dependent on the second dependent embodiment, the method comprises
- initiating energy delivery on or after the gear operator sensor detects a single gear shift.

In a fourth dependent embodiment, dependent on the second or third dependent embodiment, the method comprises
- initiating energy delivery on or after the gear operator sensor detects a double gear shift, wherein the timespan for the double shift is twice the timespan for the single shift.

In a fifth dependent embodiment, the method comprises;
- detecting a cadence from a cadence detector;
- initiating energy delivery when the cadence is above or equal to an upper threshold or below or equal to a lower threshold.

In a sixth dependent embodiment the pre-defined timespan ts1 is less than 0,5s, less than 0,3 s or less than 0,2 s for a single gear shift.

In a sixth dependent embodiment the sign of the energy delivery depends on whether the control system initiates an up-shift or a down-shift.

In a seventh dependent embodiment, the gear shift element comprises physical end-stops for calibration where the end-stops are outside the region between the upper lower gear.

In an eight dependent embodiment, the method comprises;
- moving the shift element until the end-stops have been reached as part of an initialization process.

EM 12: The method according to any of EM 6 to EM 11, comprising;
- ending energy delivery when motor torque falls below the Set STT after the control system has sent the dip control signal 154.

In a first dependent embodiment, the method comprises;
- ending energy delivery when the gear position detector indicates that at least one gear has been shifted.

EM 13: The method according to any of EM 10 to EM 12, wherein the energy source is a servo motor configured to provide rotational energy.

In a first dependent embodiment, the method comprises starting and stopping of the servo motor.

In a second dependent embodiment, that may be combined with the first dependent embodiment, the method comprises operating the servo motor in forward and reverse directions.

EM 14: The method according to any of EM 10 to EM 13, wherein the gear system comprises a speed reduction mechanism 40, 240 arranged between the energy source and the energy storage element, wherein the speed reduction mechanism is arranged to transfer energy from the servo motor to the energy storage element.

In a first dependent embodiment, the speed reduction mechanism is a reduction gear.

In a second dependent embodiment, dependent on the first dependent embodiment, the reduction gear is a single-input/single-output reduction gear.

The reduction gear may in embodiments be a double or triple reduction gear.

EM 15: The method according to any of EM 10 to EM 14, wherein the energy storage element comprises a resilient mechanical element 31, 231 configured to be elastically deformed between an input and an output.

In a first dependent embodiment, the inputs and outputs of the resilient mechanical element are connected to the energy source and the movable shift element, respectively. Optionally the input is connected via the reduction mechanism 40, 240.

In a second dependent embodiment, that may be combined with the first dependent embodiment, the resilient mechanical element is mechanically pre-loaded. I.e., it is elastically deformed when there is no energy provided from the energy source.

EM 16: The method according to any of EM 10 to EM 15, wherein the movable shift element is a shift axle.

In a first dependent embodiment, the method comprises rotating the shift axle to shift gears of the multispeed gear system.

EM 17: The method according to any of EM 15 to EM 16, wherein the resilient mechanical element is a spring configured to be loaded with potential energy.

In a first dependent embodiment, the resilient mechanical element is a coil spring.

In a second dependent embodiment, dependent on the first dependent embodiment, the coil spring is pre-loaded by compression by a force of at least 0.1 or 0.2 Nm.

In a third dependent embodiment the shift axle comprises one or more longitudinal grooves in its inner wall 11a, 11b, and the energy storage element comprises a pin 32 adjacent to the output or second end 31b of the coil spring, wherein the end or ends of the pin is arranged in the one or more grooves in the inner wall of the shift axle and prevented from rotating relative to the shift axle but allowed to move longitudinally relative to the shift axle. The pin is configured to compress the spring when pushed against the second end of the spring.

In a third dependent embodiment that may be combined with the second dependent embodiment, the energy storage element comprises a fixing member 33 comprising a radial guiding protrusion that extends into the second end of the coil spring, wherein the pin is arranged in a transversal bore of the fixing member.

EM 18: The method according to EM 17 wherein the energy storage element comprises a sleeve 34 with first and second ends 34a, 34b arranged longitudinally inside the shift axle, wherein the spring and the fixing member are arranged inside the sleeve, and wherein the fixing member is configured to rotate and slide inside the sleeve.

In a first dependent embodiment, an outer diameter of the sleeve is similar to an inner diameter of the shift axle in a cross section.

EM19: The method according to EM 18, wherein a wall of the second end of the sleeve, comprises a through bore for the pin.

In a first dependent embodiment, wherein the spring is a coil spring, the position of the through bore corresponds to the position of the pin when the coil spring is preloaded, but in equilibrium position, i.e., not compressed or loaded with potential energy from the energy source.

In a second dependent embodiment, that may be combined with the first dependent embodiment, the wall of the second end 34b of the sleeve comprises two cuts 35a, 35b and 36a, 36b extending in opposite directions from the through bore towards the first end of the sleeve.

The cuts may be curved along the circumference of the wall of the sleeve, wherein a lateral component of the curve increases faster than a longitudinal component for a curve segment of the curve in the direction from the second end to the first end of the sleeve.

The cuts may be symmetrical about the longitudinal axis.

In a third dependent embodiment, that may be combined with the second dependent embodiment, the circumferential length of each of the cuts correspond to at least a rotation of the pin and the shift axle one single gear shift. I.e., if a single gear shift corresponds to a 10 degree rotation of the shift axle, the circumferential length of the cut corresponds to the arc of a sector where the radius is the radius of the sleeve and the angle of the sector is 10 degree.

In a fourth dependent embodiment that may be combined with the second or third dependent embodiment, the longitudinal length of the cuts corresponds to at least the compression of the spring when the pin and the shift axle are rotated one single gear shift.

In a fifth dependent embodiment, that may be combined with the any of the second to fourth dependent embodiments, the length of the cuts in the wall of the sleeve corresponds to at least a rotation of the pin and the shift axle one doble gear shift or two consecutive single gear shifts. The circumferential length of the cuts allows the pin to rotate two consecutive gear shifts, i.e., 20 degrees if each shift is 10 degrees as explained above.

In a sixth dependent embodiment, that may be combined with any of the second to fourth dependent embodiments, the longitudinal length of the cuts corresponds to at least the compression of the spring when the pin and the shift axle one doble gear shift or two consecutive single gear shifts.

The cuts allow the pin to move in the longitudinal and rotational direction with regard to the sleeve, as constrained by the cuts.

Further, and according to any of the embodiments where the pin or sleeve or shift axle are mentioned, these elements may be symmetrical about a longitudinal plane, where the shift axle comprises two opposite longitudinal grooves, the pin has two protruding ends arranged in respective longitudinal grooves in the shift axle, and the sleeve comprises two opposite through bores for the pin.

The pin is forced into the through bore of the sleeve by the force of the spring. The spring may also be pre-loaded as explained previously. When the sleeve is rotated by the energy source, e.g., the servo motor, via the reduction gear the pin will rotate the shift axle accordingly. This is the case when the shift axle rotates freely and do not set up any counter torque.

In the case where the shift axle resists rotation due to a counter torque, the pin will be pushed laterally and longitudinally from the through bore into the cuts of the sleeve. However, since the cuts have a longitudinal component, the coil spring will be compressed in the longitudinal direction and the torque of the pin acting on the shift axle increases more and more when the spring is compressed. When the torque of the pin increases above the absolute value of the counter torque, the potential energy of the spring is released in a very short time when the spring expands, and the pin is forced to follow the curved path of the cuts.

In the case where the resilient mechanical element, i.e., the spring is pre-loaded by compression, the pin will remain in the through bore as long as the absolute value of the counter torque is lower than the torque resulting from the pre-loaded spring, pushing the pin towards the second end of the sleeve 34*b*.

The embodiments EM8 to EA19 above describe a gear system based on energy storage in a compressed spring. However, energy may in another embodiment be stored in a rotated or twisted resilient element.

EM20: The method according to any of EM 10 to EM 19, wherein, wherein the spring is configured to store rotational potential energy.

In a first dependent embodiment, a first end of the resilient element is connected to the energy source 20, wherein the energy source is configured to rotate the first end of the spring.

In a second dependent embodiment, that may be combined with the first dependent embodiment, the second end of the resilient element is rotationally connected to a shift axle of a multispeed gear system and the resilient element is configured to rotate the shift axle when a torque of the second end of the resilient element increases above the counter torque of the shift axle.

In a third dependent embodiment, that may be combined with the first or second dependent embodiment, the resilient element is a torsion spring.

In a fourth dependent embodiment, that may be combined with any of the first to third dependent embodiments, the resilient element is pre-loaded in one or two rotational directions. Alternatively, two springs may be used that are pre-loaded in opposite rotational directions.

The energy source may in any of the embodiments if not otherwise specified be e.g., an electric motor, a solenoid or a hydraulic or pneumatic motor.

The gear system may in any of the embodiments be hollow, where any of the sleeve, resilient element, fixing member etc. are hollow. This allows a wheel bolt through the gear system in the case where the gear system is arranged in a wheel hub.

EM 21: The method according to any of EM 1 to EM 20 wherein the method features are performed sequentially.

EM22: The method according to any of EM 1 to EM 17, wherein the gear shift actuator 210 comprises a longitudinal energy transfer element 250 configured to interconnect the gear shift element 210 and the energy storage element 230; and wherein the energy source 220 is configured to load or charge the energy storage element 230 with potential energy via a movement of the energy transfer element 250 in its longitudinal direction with regards to the energy storage element.

In a first dependent embodiment, the energy transfer element 250 is rotationally fixed to the energy storage element 230.

In a second dependent embodiment, that may be combined with the first dependent embodiment, the energy source 220 is configured to rotate the energy transfer element 250 and the energy storage element 230.

In a third dependent embodiment, that may be combined with the second dependent embodiment, the energy transfer element 250 is configured to move longitudinally with respect to the energy storage element 230 when the energy storage element 230 is rotated by the energy source 220 and the gear shift element 210 is providing a counterforce on the energy transfer element 250 above a predefined force limit.

The invention is also a set of embodiments for a pedally propelled vehicle gear system.

ES 1: A pedally propelled vehicle gear system 100, comprising;
  a multi-speed gear 110, 290 configured to provide varying gear ratios between a gear input element 111 and a gear output element 112, and
  a control system 150 configured for comprising any of the method steps and features in EM 1 to EM 22.

In a dependent embodiment, the gear input element is configured to be driven from both a crank drive 130 and a motor drive 140.

In the above embodiments and the drawings, the control system has been disclosed as a single control system. However, the control system may be split into a number of sub-control systems. E.g., the control system could comprise a shift sub-control system, a motor drive sub-control system, a torque sensor sub-control system, a battery management sub-control system etc. In an embodiment, a main control system could receive the shift control signal from the gear shift operator and forward this to a shift control system. The shift sub-control system could receive torque values from a torque sub-control system and provide pre-boost, boost and dip control signals to a motor drive sub-control system.

Figure 1:
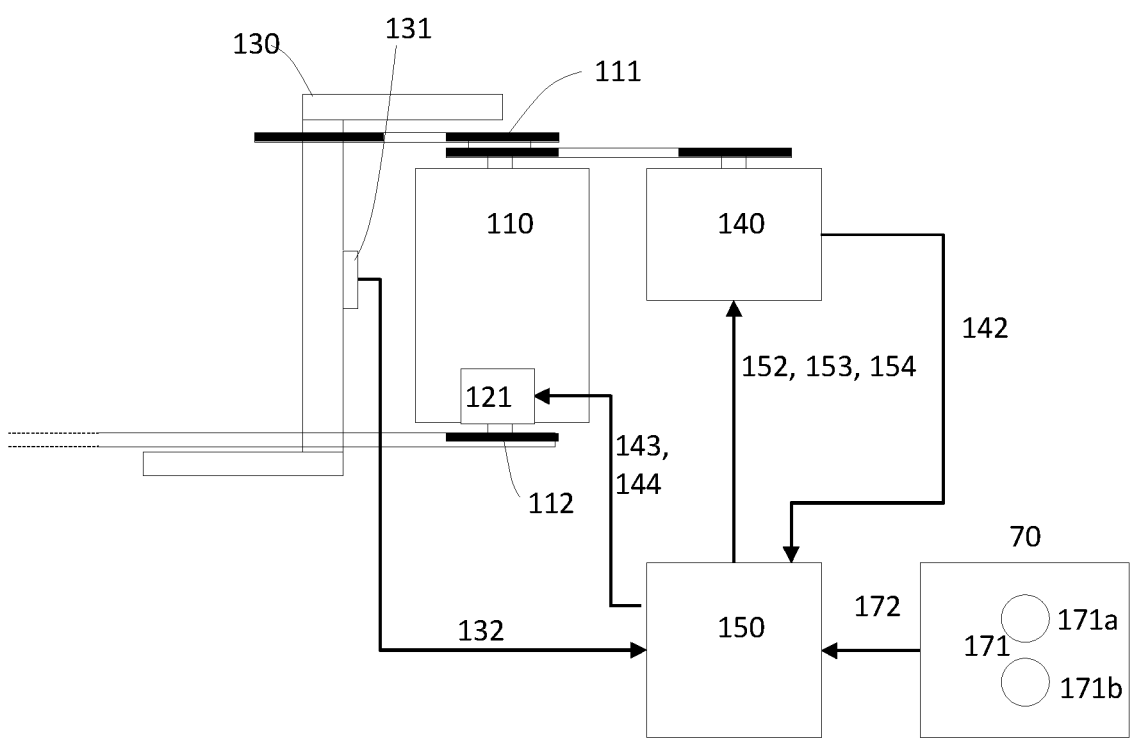
FIG. 1 illustrates in a schematic drawing an embodiment, wherein the multi-speed gear is co-located with the crank drive.
Figure 2:
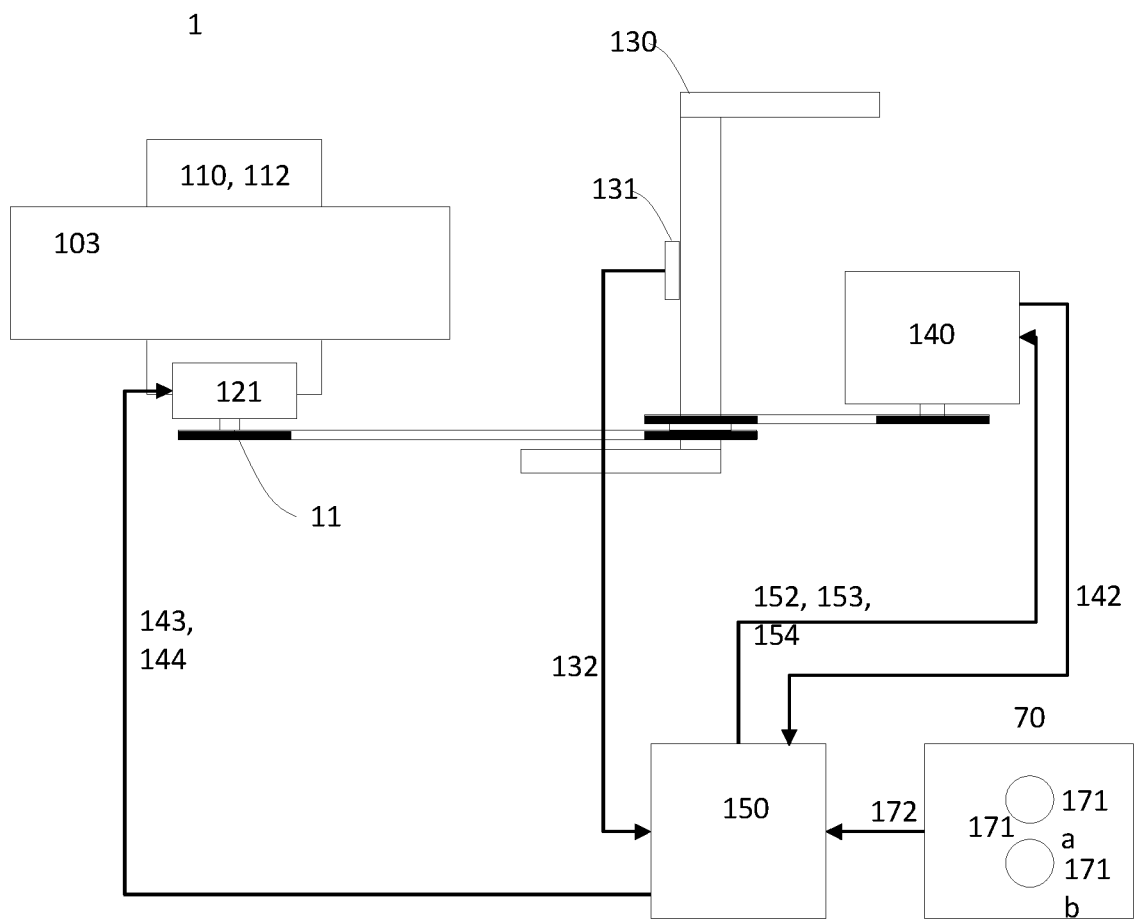
FIG. 2 illustrates in a schematic drawing an embodiment, wherein the multi-speed gear is arranged in the wheel hub.

FIG. 1 and FIG. 2 describe two different embodiments of the pedally propelled gear system according to the invention.

Starting with FIG. 1, the pedally propelled gear system 100 is a mid-drive or a crank-drive comprising a multispeed gear-shift system 110 with a gear input element 11 and a gear output element 112. In this case both gear input and output elements are rotating axles, but they may also be rotating cylinders, rotating sleeves etc. A pedally propelled crank drive 130 drives the gear input element via a crank transmission. Further an electric motor 40 is also configured to drive the gear input element 111 via a motor transmission. The crank and motor transmissions are in this case chain drives. One-way clutches, such as sprag clutches are used in the chain drives to prevent the motor to drive the crank and the crank to drive the motor.

The motor is controlled by a control system 150. Further, a gear shift operator 170 is configured to send shift control signals 172 to the control system to initiate the gear-shift sequence. After receiving the shift control signal, the control system is able to send first or second gearshift signals 143, 144 to the shift actuator 121, where the shift actuator is configured to move a movable shift element configured to shift gears in the multispeed gear system. In this case the movable shift element is a rotating shift element arranged axially inside the multispeed gear system.

Further, the control system is configured to send any combination of a pre-boost control signal 152, a boost control signal 153 and a dip control signal 154 to the electric motor drive.

The crank drive comprises a crank torque sensor 131, where a crank torque signal 132 indicative of the crank torque from the crank torque sensor is obtained by the control system. The control system further obtains a motor torque signal 142 indicative of the motor torque from the motor drive.

FIG. 2 illustrates a pedally propelled gear-shift system according to an embodiment of the invention. In this embodiment the multi-speed gear 110 is arranged in the wheel hub of a wheel 103 of a pedally propelled vehicle. In this case the gear output element 112 is the housing of the multi-speed gear, which is connected to—and driving the wheel 103. The pedally propelled crank drive 130 drives the gear input element via a crank transmission. Further, the electric motor 40 is also configured to drive the gear input element 111 via a motor transmission further driving the crank transmission. The crank and motor transmissions are in this case chain drives where the chain wheels are both co-axially arranged on the crank axle of the crank drive. The crank axle is one-way connected to the crank transmission by a one-way clutch. The chain wheel of the motor drive coaxially arranged on the crank axle is freewheeling with regards to the crank-axle, and one way connected to the chain wheel of the chain drive by a one-way clutch, such as a sprag clutch.

The remaining features are similar to the corresponding features of FIG. 1.

Specific embodiments will now be described with reference to FIG. 1 or 2 in combination with FIGS. 3, 4, 5 and 6 in combined timing/sequence and torque diagrams, respectively. It should be noted that the time scale t is for illustration only, and do not represent a linear time scale. The main purpose of the time scale is to illustrate the sequence of occurrences in sequence and the corresponding torque response in the gear system. Thus, the time represented by the distance between two consecutive vertical dashed lines may represent time spans from 0 to infinity if not further specified.

Similarly, the purpose of the torque scale is to illustrate relative torque values and do necessarily represent real values.

Figure 3:
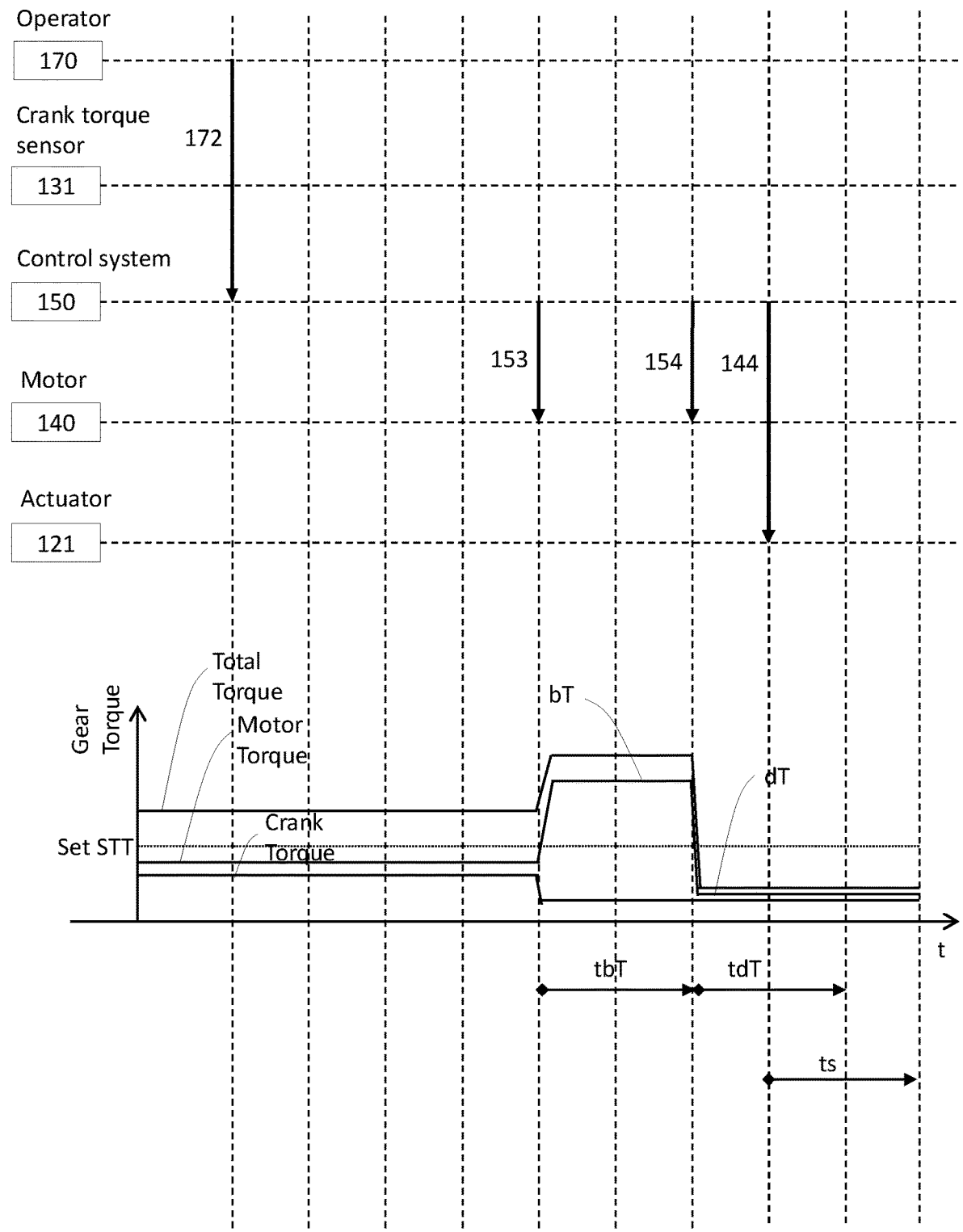
FIGS. 3, 4, 5 and 6 illustrate in combined timing and torque/energy diagrams operation of a pedally propelled vehicle gear shift according to embodiments of the invention.

FIG. 3 illustrates a gear shift according to an embodiment of the invention.

The upper part of FIG. 3 comprises a timing diagram involving from the top, the gear shift operator 170, the crank torque sensor 131, the shift control system 150, the motor drive 140 and the shift actuator 121.

In a timed sequence the control system 150 receives a shift control signal 172 from the shift operator 170. This could be triggered by a rider operating the shift operator.

A boost control signal 153 is then sent from the control system to the motor drive. This indicates the start of the Boost torque time-period tbT.

This will cause an increase in the torque contribution from the motor on the gear input element. This torque increase will cause the input element to obtain a speed advantage with respect to the crank drive also driving the gear input element. Thus, the torque contribution from the crank drive on the gear input element decreases, and the torque contribution from the crank has been off-loaded, as illustrated by the lower line in the gear torque/timing diagram.

After the boost torque time-period, a dip control signal 154 is sent from the control system to the motor drive to reduce the motor torque. Since the torque from the crank drive is already, at least partly, offloaded, the total torque drops or dips well below the initial total torque when the control system received the shift control signal. The dip control signal is the start of the dip torque time-period tdT.

As explained initially, the gear shift will only take place if the total torque across the gearbox is below the shift torque threshold STT. In FIG. 3 STT has been indicated. It can be seen that the total torque, i.e., the sum of the torque contributions from the crank drive and the motor drive was above shift torque threshold when the control system received the shift control signal initially. Thus, a gear shift was not possible at that stage. However, in the dip torque time period the total torque is well below the shift torque threshold and a gear shift can therefore be performed.

In order to perform the shift, a second gear shift 144 signal is sent from the control system to the gear shift actuator in the start of the dip torque time period, or immediately after the dip control signal, and the gear shift can then be performed as expected even though the initial torque across the multi speed gear was above the shift torque threshold.

The shift time depends on the shift capacity of the shift actuator, i.e. actuator torque and rotational speed. Even in the case where the total torque in FIG. 3 is close to zero, a shift torque is required to shift from one gear ratio to another. This could involve e.g., axial lateral, rotational, radial and tangential movements of clutch elements, link elements and gear elements in the multi-speed gear.

For illustrative purposes the shift time is has been indicated in FIG. 3. However, as will be understood, the length of the shifting time seriously impacts the user experience of a pedally propelled vehicle. A more powerful actuator may reduce the shifting time. Such an actuator requires more power and have an increased size and weight.

FIG. 4 discloses another specific embodiment of the invention. Similar to the embodiment shown in FIG. 3, the control system sends a boost control signal 153 followed by a dip control signal 154. However, in contrast to the previous embodiment, a first gear shift signal 143 is sent from the control system to the shift actuator before the boost control signal instead of the second gear shift signal in the dip torque time period.

The shift actuator in this case has an intrinsic shift delay, allowing buildup of potential energy from the first gear shift signal 143 until the dip control signal in the shift actuator which results in a large torque and shortened shifting time ts'.

The lower graph in FIG. 4 illustrates this buildup of potential energy in the actuator. Energy builds up gradually from a minimum potential energy to a maximum potential energy. The curve for the actuator potential energy corresponds to a shifting torque available if the potential energy is released. This shifting torque corresponds to the shift torque threshold STT of the actuator. In this embodiment the shift torque threshold therefore increases until it reaches a maximum in the boost torque time period tbT.

During the loading of potential energy, the actuator is constantly ready to perform the gear shift. However, since the total torque is above the shift torque threshold the torque of the shift actuator is opposed by the total torque in the opposite direction and shifting is therefore not possible before the total torque drops below the shift torque threshold. This happens in the beginning of the dip torque time period tdT, and due to the stored energy in the shift actuator a large torque is available. This reduces the switch time and the user experience of the gear shift. For illustration, a shortened switching time ts' is illustrated at the bottom of FIG. 4.

FIG. 5 discloses another specific embodiment similar to the embodiment in FIG. 4, but in addition the shift control system 150 receives or obtains a crank torque signal 132, representative of the crank torque from the crank torque sensor 131 and a motor torque signal 142 representative of the motor torque from the motor drive 140.

The two crank signals are used to calculate the total torque across the gear system, i.e., between the gear input element and the gear output element and is in this embodiment used to determine the boost Torque level bT.

FIG. 6 discloses yet another specific embodiment, which in addition to the features described for FIG. 5 comprises a pre-boost control signal 152 from the control system to the motor drive 140 before the first gear-shift signal 143. Similar to the boost control signal, the pre-boost control signal is used to instantly increase the motor torque. The reason for the pre-boost control signal is to ensure that the total torque is maintained and stabilized above the shift torque threshold when starting to load the shift actuator with potential energy in order to prevent uncontrolled shifting in the initial phase of the gear shift, i.e., if the counteracting total torque is below the shift torque threshold.

In FIG. 6 the initial total torque, calculated as specified above, is below the shift torque threshold and it is therefore not safe to start the shift sequence. The pre-boost control signal is therefore sent to the motor to increase the total torque for a pre-boost time period pbT before the final boost control signal is sent to the motor.

In a related embodiment the pre-boost control signal is optional, and not used where the initial total torque is above the shift torque threshold.

If the value of the crank torque signal is above a pre-defined threshold, a feedback signal may be sent back from the control system to the gear shift operator that shifting is not possible. The feedback signal could result in visual, tactile or haptic feedback, e.g., a blinking light or a vibrating handle.

Since the total torque is below the shift torque threshold STT, the shift control system provides or sends a pre-boost control signal 151 to the motor to run at a pre-boost torque pT for a pre-boost torque time period tpbT.

Figure 7:
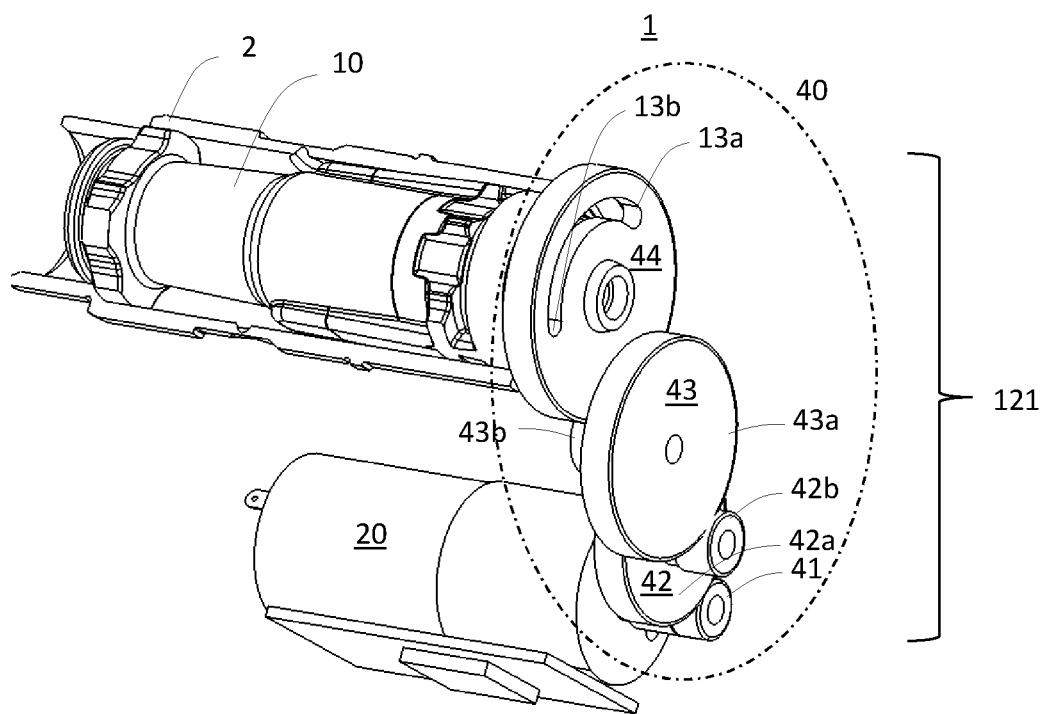
Figure 8:
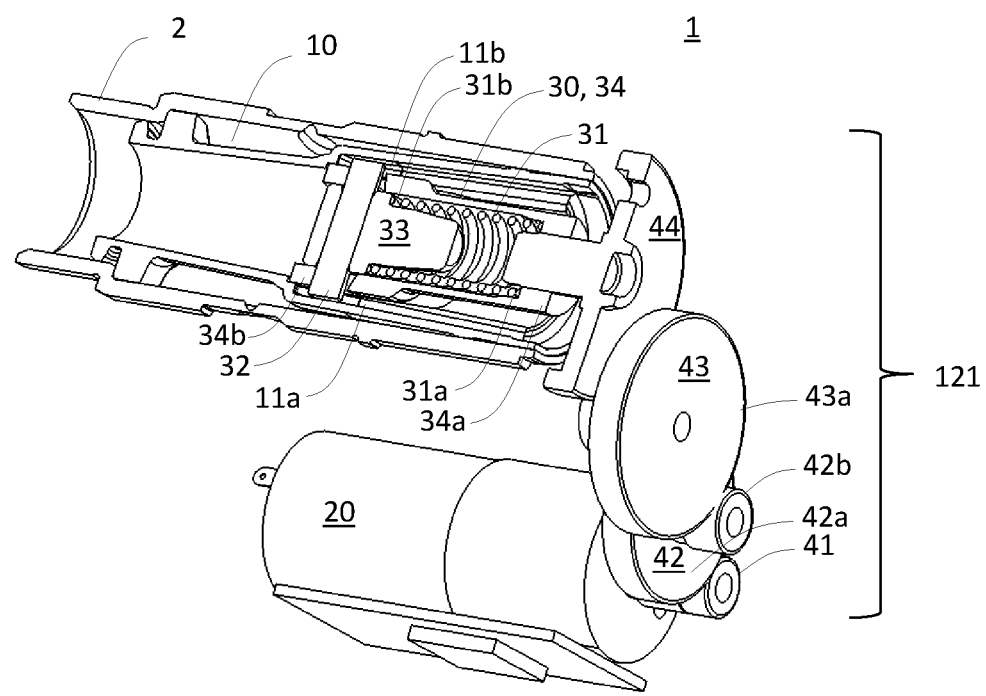
Figure 9:
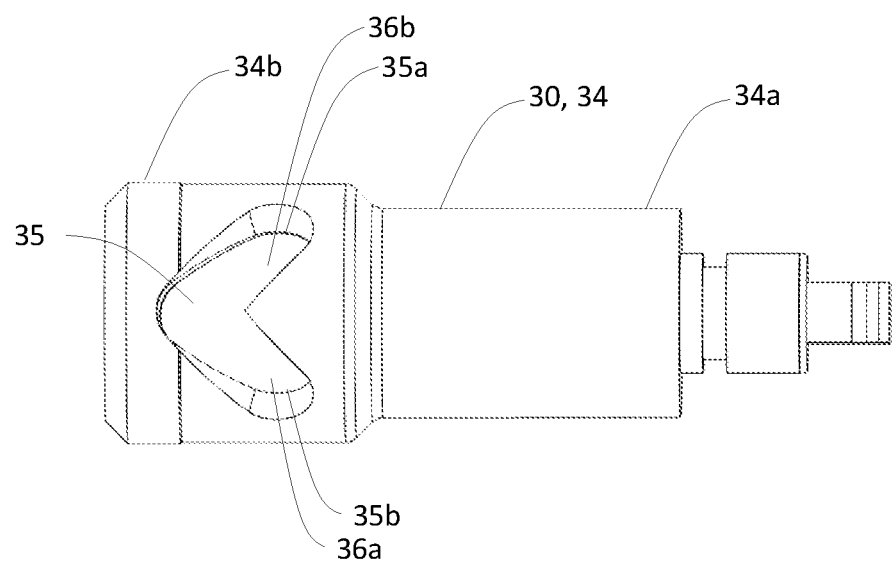
FIG. 9 illustrate in a view the energy storage element 30, as seen in FIG. 8. It can be seen that the opposite through-bores 35, 36 each continue into two cuts 35a, 35b and 36a, 36b, respectively, extending in opposite curved or helical directions, from the through bore towards the first end of the sleeve. The complete cut comprising the through bore 35 and the two helically extending cuts 35a, 35b have the shape of a first "V". The through cut 36 and the two helically extending cuts 36a, 36b defines a similar shaped "V" laterally opposite the first "V". Further, it is seen that the first end of the sleeve 34a is configured to be connected to an energy source configured to rotate the sleeve relative the shift axle.
Figure 10:
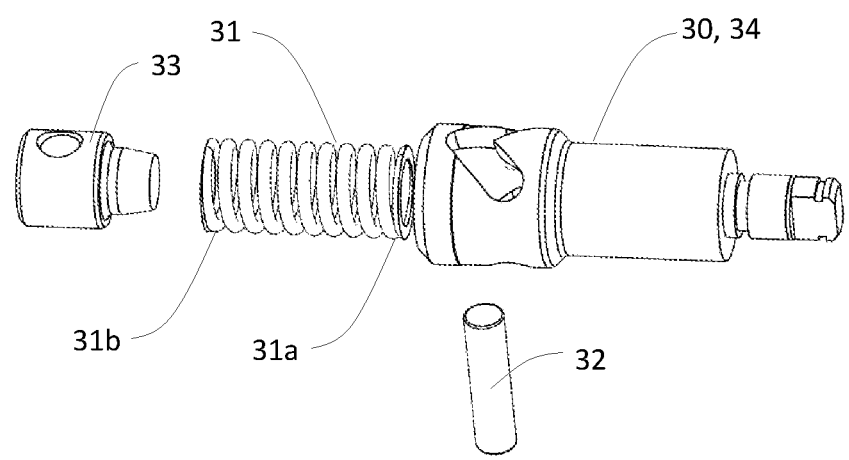
FIG. 10 illustrates in an exploded view the elements of the energy storage element 30 described previously. The spring is pre-loaded inside the sleeve after assembling. I.e. the first end of the spring abuts the inner wall of first end of the sleeve, and the second end abuts the fixing member that is pushed with a force into the sleeve before the pin is entered through the through bores in the sleeve and the fixing member.

In a specific embodiment illustrated in FIGS. 7 and 8, the vehicle gear system 1 comprises a movable shift element 10 configured to shift gears in a multispeed gear system of a vehicle. In this case, the shift element is a hollow shift axle that is arranged inside a gearbox. When the shift axle is rotated relative to the gearbox, the gear ratio of the gearbox will change according to prior art.

Depending on the type of gear mechanism used inside the gearbox, the shift axle may interact with the gears of the gearbox via e.g., clutches or pawls.

The gear system 1 further comprises an energy source 20 in the form of an electric servo motor with a drive shaft arranged in parallel with the shift axle. The electric servo motor is powered by a battery and controlled by a control system.

An energy storage element 30 comprising a pre-loaded coil spring is arranged co-axially inside the hollow shift axle.

Further details of each of these elements in this specific embodiment are given below.

The reduction gear is single-input/single-output, triple reduction gear and comprises first and second toothed gearsets 42, 43 between the motor shaft and the coil spring 31. A large diameter gear 42*a* of the first gearset 42 is meshing with a pinion gear 41 on the motor shaft. The first gearset comprises a small diameter gear 42*b* meshing with a large diameter gear 43*a* of the second gearset 43. Finally, a small diameter gear 43*b* is meshing with a large diameter shift shaft gear 44 coaxially connected to the first end 34*a* of a sleeve 34.

The type of reduction gear has been chosen to allow a servo motor small in size and power to load, i.e., compress, the coil spring with sufficient potential energy in the first part of a shift action as described previously. If a larger servo motor is used, a smaller reduction gear e.g., a double or single reduction gear, may be used instead. The coil spring is dimensioned to be compressed the amount of two consecutive gear shifts. E.g., if a 10-degree rotation of the shift axle represents one gear shift and 20-degree represents two consecutive gear shifts, the coil spring must allow the compression from a 20-degree twist during the load period for this embodiment. However, if only a single gear shift is required, the compression can be reduced. Similarly, three consecutive shifts would require a larger compression, but it would also require longer time to load with the same servo motor and reduction gear.

The sleeve 34 is comprises the coil spring. The first end of the sleeve is further connected directly to the shift shaft gear 44, and the sleeve is in this way rotated in a fixed proportional relationship with the servo motor, determined by the gear ratio of the reduction gear.

The outer diameter of the second end of the sleeve 34*b* corresponds in a cross section to the inner diameter of the shift axle, such that the sleeve is stabilized radially in its second end. In the first end the sleeve and the shift shaft gear are supported in the radial direction by a ball bearing 35 in the housing wall 2. In the longitudinal direction the sleeve is locked by a narrowing of the inner diameter of the shift axle.

The second end 31*b* of the coil spring is pushing a transversal pin 32, also comprised by the energy storage element extending into longitudinal grooves 11*a*, 11*b* of the inner wall of the shift axle 10. Thus, the pin is fixed in the rotational direction relative to the shift axle since it is prevented from rotating by the walls of the grooves. However, it may move in the longitudinal direction along the grooves.

The energy storage element further comprises a fixing member 33 arranged inside the second end of the sleeve. The fixing member has a guiding protrusion that extends into the second end of the coil spring.

The fixing member further has a transversal through bore for the pin.

The fixing member may move both rotationally and longitudinally inside the sleeve. However, these movements are constrained by the compression of the spring and the pin.

In the second end of the sleeve, first and second opposite through bores 35, 36 are made for the pin. The position of the through bores corresponds to the position of the pin when the coil spring is least compressed.

From each of the through bore, two cuts 35*a*, 35*b* and 36*a*, 36*b* are extending in opposite helical or curved directions towards the first end of the sleeve. The cuts allow the pin to move in the longitudinal and rotational direction with regard to the sleeve, as constrained by the cuts. The circumferential length of the cuts allow the pin to rotate two consecutive gear shifts, i.e. 20 degree if each shift is 10 degree as explained above.

When the sleeve is twisted by the servo motor in a first direction, and the shift axle is rotationally fixed by a counter torque, the first end of the pin will move helically or curved from the through bore 35 into the first cut 35*a*. The second end of the pin will move from through bore 36 on the opposite side and helically or curved along the first opposite cut 36*a*.

When the sleeve is rotated by the servo motor in a second direction, opposite the first direction, and the shift axle is rotationally fixed by a counter torque, the first end of the pin will move from the through bore 35 curved or helically in the second cut 36*a*. The second end of the pin will move from through bore 36 on the opposite side and helically or curved along the second opposite cut 36*b*.

The coil spring is locked in its second end by the fixing member in the longitudinal direction, which in turn is locked by the pin to the sleeve. The end of the sleeve abuts a narrowed part of the inner diameter of the shift axle. When the coil spring is in the locked position, it is pre-loaded by compression, and the pin will not be able to move from its initial position if it is not exposed to a torque that overcomes the pre-load force.

The servo motor 20 is operationally connected to a control system 50, and via a servo motor controller circuit not shown the start and stop in forward or reverse directions and the speed of the servo motor can be controlled.

A stepwise explanation of a gear shift will be given in the following section.

As soon as the control system detects that a gear shift is requested, e.g., the shift control signal 172 from the gear shift operator, a gear shift signal 143 is sent to the servo motor that will start rotating the sleeve via the reduction gear. As long as the servo motor continues to rotate the sleeve, the torque from the pin acting on the shift axle will increase.

As explained initially, the torque required to rotate the shift axle from one position to the next, heavily depends on the pedaling force of the rider and the drive motor 40.

FIG. 11 illustrates to the left schematically how inherent hardware limitations in the gear system will prevent a gear shift to take place above the Current Shift Torque Threshold, Current STT, wherein the Current STT is the maximum torque between the gear input element 111 and the gear output element 112 for a shift of gear ratio in the multi-speed gear to be performed. The Current STT may vary between Min STT and s Max STT depending on the temperature, aging of components etc.

The right part of FIG. 11 illustrates schematically how a gear shift can take place with the present invention, even in the case where a gear shift would not be possible if considering that the limitation is in the Current STT. Both the Boost Torque/Dip Torque sequence and the Energy Storage element described afterwards contribute alone or in cooperation to this advantage.

While the Current STT is the actual hardware limitation of the gearbox, the Set STT is a value in the Control system that represents the Current STT. Since we can assume that the Current STT newer can increase above the Max STT, the Set STT can be set to the static value of Max STT, optionally with a security margin as illustrated in the Figure.

FIG. 12 illustrates in a flow diagram adaptive STT according to embodiments of the invention. In one embodiment the actuator torque is adjusted based on the gear shift success rate.

In the case where the actuator torque is increased as a result of a success rate below a pre-defined success rate, the Max STT and the Min STT, as well as the Current STT illustrated in FIG. 11, will increase, which means that shifting can take place at a higher Torque across the multi-speed gear. However, if the present actuator Torque results in too long shifting time, the actuator torque may be decreased. The condition for adaptation of the actuator torque may be the success rate for the shifts, where the success rate may be a statistical value. Thus, the actuator Torque in this case is adaptive in order to balance shift success rate with shifting time.

Another way of balancing the shifting time with the success rate is to adapt the Set STT to follow the variations of the Current STT, as a result of e.g., temperature variations aging of components etc. In this embodiment, the Current STT is measured indirectly by measuring the success rate of the shifts in the same way as above. If the success rate is above a pre-defined threshold, the Set STT is increased, meaning that the Boost/Dip sequence do not have to be applied as frequent as previously, and that any of the pre-boost torque time period tpbT, boost torque time period tbT or the dip torque time period tdT may be shortened. If, on the other hand, the success rate is below a pre-defined threshold, the Set STT is decreased, meaning that the Boost/Dip sequence will be applied more frequent, and that any of the pre-boost torque time period tpbT, boost torque time period tbT or the dip torque time period tdT may be increased.

The pre-defined threshold may be implemented as a hysteresis with an upper threshold and a lower threshold, wherein Set STT is increased if the success rate is above the upper threshold and decreased if the success rate is below the lower threshold. Likewise, the actuator torque may be decreased if the success rate is above the upper threshold and increased if the success rate is below the lower threshold.

In a specific embodiment illustrated in FIGS. 13 and 14, the vehicle gear shift actuator 201 is configured to rotate a movable shift element 210. Only one end of the shift element 210 is illustrated in the drawing, however, in this embodiment, the shift element is a rotatable shift axle, where the rotational position of the shift axle determines the gear ratio of a multispeed gear system. A multi-speed gear system making use of such a rotatable shift axle is specified in detail in e.g., WO20201230842 A1.

A worm gear 211 is attached to the end of the shift axle 210. The worm gear may also be integrated with the shift axle but is here attached to the end of the shift axle with a spline coupling, allowing easy mounting and removal of the gear shift actuator and the worm gear from the shift axle.

The gear shift actuator comprises a longitudinal energy transfer element 250 with a threaded first portion 51, that may be seen as a worm in mesh with the worm gear 211 in a worm drive.

An energy storage 230 comprises a frame 232, that may also be a housing for the energy storage. The frame 232 is connected to the output of an energy source 20, in this case an electric motor, via a gear drive 240. Further, the threaded first portion 251 of the energy transfer element 250 extends out of the frame and is rotationally fixed to the frame. Thus, when the energy source rotates the frame 232, the threaded first portion 251 will rotate with the frame and rotate the worm gear 211 and the shift axle 210, in order to change to a higher or lower gear ratio. Here, rotation in one direction will change to higher gears, and rotation in the opposite direction will change to lower gears.

In order to ensure gear shifts to happen also where the counter torque is larger, the present embodiment comprises some additional features that can be seen in FIG. 16, which is a cross section of a detail in FIGS. 14 and 15, more specifically the energy storage element 230, and its internal elements.

As previously explained, the energy storage element 230 is configured to be loaded with potential energy from the energy source 220. In this embodiment the energy storage comprises a resilient element 231 in the form of a compression spring, which in an equilibrium position is held between first and second end stops 236a, 236b of the frame 232. A first end element 234a is arranged between a first end of the spring and the first end stop 236a. Likewise, a second end element 234b is arranged between a second end of the spring and the second end stop 236b. The first and second end stops have the shape of washers.

Both the first and second end elements 234a, 234b and the first and second end stops 236a, 236b have through holes, where the through holes of the first and second end stops 236a, 236b are larger than the through holes in the first and second end elements 234a, 234b.

The energy transfer element 250 extends through or partly through the holes. More specifically, a third portion 253 of the energy transfer element 250 extends through the resilient element 231 and the first and second end elements 234a, 234b, and the diameter of the third portion 253 is slightly smaller than the inner diameter of the holes of the first and second end elements 234a, 234b, allowing them to slide along the third portion 253. At each end of the third portion, the diameter increases to a value larger than the holes of the first and second end elements 234a, 234b, but equal to or smaller than the inner diameters of the first and second end stops 236a, 236b, such that the energy transfer element 250 can move longitudinally inside the frame 232.

The resilient element 231 is pretensioned, i.e., pre-compressed in the frame 232. To move the energy transfer element 250 in one direction or the other, a certain force overcoming the pre-tensioning is required.

Between the third portion 253 and the first portion 251 of the energy transfer element 250, a second portion 252 is rotationally fixed but axially free with regards to the frame 232. I.e., the second portion 252 will rotate with the energy storage element 230, while still being able to move longitudinally. This is achieved by a splined coupling where the second portion 252 has external longitudinal splines and the inner diameter of the corresponding part of the frame has corresponding inner longitudinal splines.

The frame 232 is rotationally supported by a first rotational bearing 255. In addition, one end of the energy transfer element 250 is supported rotationally and longitudinally by a slide bearing 256.

Further, the energy storage element 230 comprises a magnet in its side wall, allowing a magnetic sensor arranged in the housing and connected to a control system to detect each time a full rotation has been completed in order to control the electric motor to stop when the required number of turns for the requested gear shifts has been reached.

The functionality of the gear shift actuator will further be explained with reference to FIGS. 17a to 17b.

Considering first that the resilient element is in an equilibrium position as in FIG. 16, where a force acting on the energy transfer element 250 must overcome the pre-tension force on the resilient element to move the transfer element longitudinally.

Considering also, in a first scenario that the shift axle 211 can be rotated with a minimum torque to change gears, i.e., the counter torque from the shift axle acting on the energy transfer element via the worm drive is small compared to the pre-tensioning of the resilient element 31. When the electric motor rotates the energy storage element 230, the energy transfer element 250 and its first portion with the worm also rotates. The rotating worm will act on the worm gear 211 and the shift axle 210. Thus, the rotation of the shift axle is directly proportional to the rotation of the energy storage 230 and to the rotation of the motor axle driving the energy storage element via the gear drive 240.

The rotational direction of the shift axle depends on the operating direction of the motor.

The actual rotational angle for the shift axle 210 required for switching from one gear to the next depends on the geometry of the gear system itself. Anyhow, for a multispeed gear system, continuous rotation would typically mean that multiple gear shifts may happen sequentially as the energy storage element 230 continues to rotate. For e.g., a seven-gear system initially in the first gear, any of the second, third, fourth, fifth, sixth or seventh gears can be selected by rotating the energy storage element in a single direction. For any single or multiple shifts in the opposite direction, the energy storage element 230 is rotated in the opposite direction.

Turning now to FIG. 17a, illustrating a different scenario where the intention is to rotate the shift axle 210 counterclockwise to switch one or more gears. However, due to the counter torque on the shift axle being comparatively larger than the pre-tensioning of the resilient element 31, the resilient element is further compressed by the upper end of the energy transfer element 250 and the first end element 34 as the energy storage element 230 and the energy transfer element 250 rotates and the threaded first portion 251 climbs the worm gear that resists rotation.

FIG. 17a illustrates an end position of the energy transfer element 250 and the resilient element 31. It should be noted that the resilient element in this position has been loaded with potential energy, and that the force that it is acting on the energy transfer element in the upward direction with, is considerably larger than the pre-tension force at equilibrium. Thus, if at any time from the equilibrium position to the end position, the absolute value of the increasing upward force on the energy transfer element surpasses the absolute value of the downward force acting on the energy transfer element as a result of the counter torque on the shift axle, the shift axle will be forced to rotate in the counterclockwise direction as intended, and the energy transfer element return to its equilibrium position.

In the event that the counter torque still cannot be overcome by the force from the energy storage, the gear change will be performed only after the torque on the shift element has decreased to a value allowing shifting.

If switching of more gears in the same direction is intended, rotation of the energy storage element should continue according to the scenario described above for FIGS. 16 and 17a.

The energy storage element 250 in FIG. 17a is illustrated in an end position, e.g., no further longitudinal movement downwards is possible since the end of the worm drive has been reached. The end position may correspond to a fixed number of gears changes, e.g., one, two or three. If e.g., the end position corresponds to two gear shifts and the control system only requested one shift, rotation of the energy storage element 230 should stop as soon as the required number of rotations for shifting one gear has been reached, before the end position of the energy transfer element 250.

FIG. 17b illustrates another scenario where the intention of the rider is to rotate the shift axle clockwise, i.e., opposite of the direction of the previous scenario in FIG. 4c. Due to the counter torque on the shift axle being comparatively larger than the pre-tensioning of the resilient element 31, the resilient element is further compressed by the lower end of the energy transfer element 250 and the second end element 34 as the energy storage element 230 and the energy transfer element 250 rotates and the threaded first portion 251 climbs the worm gear that resists rotation.

The rest of the scenario can be understood from the description of FIG. 17a, with the difference that the forces are acting in the opposite directions.

FIG. 15 illustrates another embodiment of the invention where the shift element 210 is one or more pawls or notches that are moved in a transverse direction of the gear to engage and disengage gears in an internal gear. The actual type of internal gears is not important for the invention and are therefore not illustrated in the drawing. However, considering that the gear system has a housing 200, through which a main axle 213 extends, where the main axle may be fixed to a frame of the vehicle. The input and output elements of the gear system has not been shown, but typically an input axle could be arranged coaxially and rotationally outside the main axle, and the housing itself could be directly connected to the output element and rotate relative to the main axle and the input axle.

Here the internal elements of the energy storage elements 230 and their functionality is the same as in the embodiment above. The energy source and the drive gear could also be the same. The main difference is that the energy transfer element 250 extends into the main axle 213. In this case a portion 212 of the energy transfer element and an internal part of the shift element 210 are correspondingly threaded. Thus, when the energy transfer element 250 is rotated by the energy source, the shift element 210 will move laterally in slits 211 in the main axle and move internal gear elements 220 sideways and change the way internal gears mesh.

In the same way as for the embodiment above, the energy storage element 230 will become loaded with potential energy should the counter torque from the internal gear elements exceed the pre tensioning of the resilient element. As the energy transfer element rotates, the force from the shift element acting on the internal gear elements increases, and if this force at any time increases above the force in the opposite direction as a result of counter torque, the internal gear elements will move to shift gears.

As a further alternative to the embodiment in FIG. 15, the energy transfer element 250 could be split in two, where the two parts are interconnected with angular gears, e.g., bewel gears, that would allow the gear shift actuator to be arranged conveniently on the vehicle.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A computer-implemented method for operating a pedally propelled vehicle gear system, the gear system including a multi-speed gear configured to provide varying gear ratios between a gear input element and a gear output element, a crank drive configured to transmit torque to the gear input element, a motor drive configured to transmit torque to the gear input element, and a movable shift element configured to shift the multi-speed gear between the gear ratios, the method comprising:
receiving a shift control signal indicating that a gear shift should be performed;
providing a boost control signal to the motor drive to run at a boost torque bT for a boost torque time period tbT; and
providing a dip control signal to the motor drive to run at a dip torque dT for a dip torque time period tdT, the boost torque being higher than the dip torque,
wherein the gear system has a Current Shift Torque Threshold (STT) defined as the maximum allowable torque between the gear input element and the gear output element at which a shift of gear ratio in the multi-speed gear is able to be performed.

2. The method according to claim 1, wherein the Current STT is in the range equal to or larger than a minimum STT and equal to or smaller than a maximum STT.

3. The method according to claim 2, wherein the maximum STT is a pre-defined value based on a worst-case shifting torque.

4. The method according to claim 2, wherein the minimum STT is a pre-defined value based on best case shifting torque, including best performing operating temperature, beginning of service interval, and run-in gear components.

5. The method according to claim 2, wherein one or more of the maximum STT and the minimum STT are gear shift specific.

6. The method according to claim 1, further comprising:
receiving a crank torque signal from a crank torque sensor representative of the torque difference between the crank drive and the gear input element, and
receiving a motor torque signal from the motor drive representative of the torque difference between the motor drive and the gear input element,
wherein the sum of the boost torque and a crank torque from the crank torque signal is higher than the Current STT, and
the sum of the dip torque and the crank torque from the crank torque signal is lower than the Current STT.

7. The method according to claim 1, further comprising:
providing a pre-boost control signal to the motor to run at a pre-boost torque pT for a pre-boost torque time period tpbT after receiving a shift control signal and before providing a control signal to the motor to run at a boost torque bT,
wherein the pre-boost torque is lower than the boost torque and higher than the dip torque.

8. The method according to claim 7, further comprising:
receiving a crank torque signal from a crank torque sensor representative of the crank torque as the torque difference between the crank drive and the gear input element;
receiving a motor torque signal from the motor drive representative of the motor torque as the torque difference between the motor drive and the gear input element;
calculating a total torque as the sum of the crank torque and the motor torque; and
providing the pre-boost control signal only when the total torque is below a pre-boost torque threshold.

9. The method according to claim 1, wherein the multi-speed gear comprises a gear shift actuator configured to move the shift element, and
the method further comprises sending a first gearshift signal to the gear shift actuator before providing the boost control signal to the motor drive.

10. The method according to claim 9, further comprising:
sending the first gearshift signal to the gear shift actuator after providing the pre-boost control signal.

11. The method according to claim 1, further comprising:
measuring the success rate of a series of gear shifts;
increasing the Set STT and/or decreasing the actuator force/torque when the success rate is above a pre-defined high success rate threshold; and
decreasing the Set STT and/or increasing the actuator force/torque when the success rate is below a pre-defined low success rate threshold.

12. The method according to claim 9, wherein the shift actuator comprises:
- a movable shift element configured to shift gears in the multispeed gear,
- an energy source, and
- an energy storage element,
- wherein the energy source is configured to load or charge the energy storage element with potential energy,
- wherein the shift torque threshold is determined by the potential energy, and the energy storage element is configured to move the shift element.

13. The method according to claim 12, wherein the energy storage element is configured to move the shift element in two opposite directions from an equilibrium position wherein the energy storage element is not charged or loaded with energy from the energy source.

14. The method according to claim 13, further comprising:
- initiating energy delivery from the energy source to the energy storage element at a start time to, and
- ending energy delivery a pre-defined timespan ts1 after the start time, or ending energy delivery when the energy storage element has obtained a specific position or rotational angle.

15. The method according to claim 1, wherein the gear input element is configured to be driven from both the crank drive and the motor drive.

16. A data processing control system comprising:
- one or more processors configured to carry the method of claim 1.

17. A computer program comprising instructions which, when the program is executed by a computer, cause the computer to carry out the method of claim 1.

18. A non-transitory computer-readable medium comprising instructions which, when executed by a computer, cause the computer to carry out the method of claim 1.

19. A pedally propelled vehicle gear system, comprising:
- a multi-speed gear configured to provide varying gear ratios between a gear input element and a gear output element; and
- a control system configured to process the method according to claim 1.

20. A computer-implemented method for operating a pedally propelled vehicle gear system, the gear system including a multi-speed gear configured to provide varying gear ratios between a gear input element and a gear output element, a crank drive configured to transmit torque to the gear input element, a motor drive configured to transmit torque to the gear input element, and a movable shift element configured to shift the multi-speed gear between the gear ratios, the method comprising:
- receiving a shift control signal indicating that a gear shift should be performed;
- providing a boost control signal to the motor drive to run at a boost torque bT for a boost torque time period tb, after receiving the shift control signal;
- providing a dip control signal to the motor drive to run at a dip torque dT for a dip torque time period tdT, the boost torque being higher than the dip torque, after providing the boost control signal to cause a total torque across the multi-speed gear to drop below a Current Shift Torque Threshold (STT) defined as the maximum allowable torque between the gear input element and the gear output element at which a shift of gear ratio in the multi-speed gear is able to be performed; and
- performing the gear shift when the total torque drops below the Current STT.

\* \* \* \* \*